(12) United States Patent
Wu

(10) Patent No.: US 8,032,536 B2
(45) Date of Patent: Oct. 4, 2011

(54) SYSTEM AND METHOD FOR APPLYING NETWORK PROTOCOLS TO TELEPHONY

(75) Inventor: Guangdian Gordon Wu, Houston, TX (US)

(73) Assignee: Base Base Corporation, Houston, TX (US)

( * ) Notice: Subject to any disclaimer, the term of this patent is extended or adjusted under 35 U.S.C. 154(b) by 860 days.

(21) Appl. No.: 10/739,772

(22) Filed: Dec. 18, 2003

(65) Prior Publication Data
US 2004/0131170 A1 Jul. 8, 2004

Related U.S. Application Data

(60) Provisional application No. 60/435,798, filed on Dec. 19, 2002.

(51) Int. Cl.
*G06F 7/00* (2006.01)
(52) U.S. Cl. ......... 707/749; 707/718; 709/219; 715/740
(58) Field of Classification Search .................. 707/749, 707/718; 715/740; 709/217
See application file for complete search history.

(56) References Cited

U.S. PATENT DOCUMENTS

| | | | | |
|---|---|---|---|---|
| 5,850,517 A | * | 12/1998 | Verkler et al. ................. | 709/202 |
| 5,978,672 A | * | 11/1999 | Hartmaier et al. ............ | 455/413 |
| 5,991,836 A | * | 11/1999 | Renda ............................. | 710/58 |
| 6,055,513 A | * | 4/2000 | Katz et al. ....................... | 705/26 |
| 6,157,941 A | * | 12/2000 | Verkler et al. ................. | 709/202 |
| 6,202,062 B1 | * | 3/2001 | Cameron et al. ................ | 707/3 |
| 6,401,085 B1 | * | 6/2002 | Gershman et al. ............... | 707/4 |
| 6,412,073 B1 | * | 6/2002 | Rangan ............................ | 726/5 |
| 6,952,836 B1 | * | 10/2005 | Donlan et al. ................ | 725/116 |

* cited by examiner

*Primary Examiner* — Don Wong
*Assistant Examiner* — Tuan-Khanh Phan
(74) *Attorney, Agent, or Firm* — Baker Botts L.L.P.

(57) ABSTRACT

A system and method are provided for enabling telephone users to place information on a network that is accessible by a variety of devices from disparate communication protocols are provided. A telecommunications network provides access to one or more servers to one or more customers. A customer that is provided access to the server is enabled to create a basis of operations called a phonesite. The phonesite is constructed and arranged to allow read, write, and execute privileges to the customer and to those designated by the customer. Files and other information on the phonesite can be accessed and edited from, for example, a standard telephone, a personal computer, a personal digital assistant, a web cam, an instant message client, and the like. Customers are given a single number with which to access the phonesite, or to allow others to access the phonesite. Other organizations or individuals with phonesites can exchange information in an automated fashion once connection between the two phonesites is authorized and established.

15 Claims, 25 Drawing Sheets

Personal Base

Top Info
Breaking News, Weather, Stocks, Traffic, Emergency

Communication
My Family, Work Related, Family and Friends, Group 1, Group 2, Online Chat, ICQ, Instant Messenger, Video Conferencing

Information
News, Business News, Company News, Sports Scores, Local News

Transactions
Shopping, Stock Trade, Bill Paying, Bank Accounts, Investment, Travel Arrangement

Internet Activities
Community, Vote, Being Monitored

Notice Board
Events, Products, Services, Activities

Request and Feedback
My Constant Searches, Job-Seeking, My Specific Searches, Yahoo Search

Supply and Feedback
Sell Things, Provide Service, my Resume

Life Management
Calendar, To Do List, Dates and Events, Current Task 1

Monitoring and Control
Kid 1, Kid 2, House, Pet, Car 1, Car 2, Car PC, Cell Phone, TV, VCR

Work
Project 1, Project 2, Files, Contacts

Study
School, Hobby, Knowledge

Entertainment
Games, Movies, Music, Radio, TV, Leisure Reading, Chess

Information Archive
From Cell Phone, Links, Topic 1, Topic 2

File Storage
My Files, Photos, Web Sites, Newspapers, Music

Editing
My Base, Passwords, Dates, Addresses, Grocery List, Clothes Size, Social Security Number, Secure Files

SYSTEM AND METHOD FOR APPLYING NETWORK PROTOCOLS TO TELEPHONY

CROSS REFERENCE TO RELATED APPLICATIONS

This application is a conversion of U.S. Provisional Application Ser. No. 60/435,798 to Mr. Guangdian Gordon Wu entitled "METHOD AND APPARATUS FOR APPLYING WORLD WIDE WEB PROTOCOL TO TELEPHONY" that was filed on Dec. 19, 2002, and is incorporated by reference herein for all purposes.

BACKGROUND OF THE INVENTION TECHNOLOGY

1. Field of the Invention

The present invention is related to telephone communications. More specifically, the present invention is related to enhance communication capabilities for telephonic client devices with software processes or other devices that are connected to wide area networks, telephone networks, and/or other software processes.

2. Description of the Related Art

Handheld cellular telephones have been in use for many years. However, handheld telephones, because of their limited computing capacity and limited battery power capabilities, have had several limitations. One of the more notable limitations of handheld cellular units is their lack of memory capacity. While handheld cellular units are able to utilize a menu system, the menus can contain a very limited amount of information. One very useful feature, however, of handheld units is their ability to establish communications from remote locations. In the past, the first remote services tended to be a connection to a human being at a place and time, such as a secretary who can relay pertinent information to an executive, for example. Unfortunately, this extra capability for the handheld unit comes at a price, mainly the productivity impact of having a person at the other end to retrieve and transmit pertinent information.

It would be helpful if the process of exchanging information with handheld units could be automated. It is also desirable that current telephones be able to interact with more processes and devices than are presently connected to the current telephone network.

What is needed is a telephone device that can communicate context-sensitive information to the user and to other similar processes. Moreover, there is a need for the telephone to enable the user to communicate with software processes and client devices that operate on other telephone and non-telephone networks.

SUMMARY OF THE INVENTION

The present invention remedies the shortcomings of the prior art by providing a system and method for enhancing the ability of cellular devices to perform information exchange between other client and server devices and software processes. With the enhancements provided by the present invention, fewer devices would have to be carried by the individual because a single cellular telephone could accomplish the same and more tasks.

The present invention consists of a set of one or more networks that are interconnected to provide multiple access points to a central repository of information. Cellular devices, personal computers, and other client devices can access the central repository to retrieve information. In addition, the central repository is provided with logic and processing capacity so that software processes, acting on behalf of the customer, may convey information to the customer or designated third party to facilitate the exchange of information with minimum input or participation by the customer. In short, the system of the present invention provides both connectivity and the automatic dissemination of context sensitive information in a controlled and secure manner.

Application of Internet standards to the central repository enables the present invention to interoperate with a wide array of client and server devices than was heretofore possible. Moreover, the present invention can store and retrieve information in a variety of formats (such as text and voice) and convey any of the files to client devices. In some cases, it may be necessary for a process associated with the present invention to first convert the information from one format (such as voice) to another format (such as text), depending upon the capabilities of the client device.

BRIEF DESCRIPTION OF THE DRAWINGS

A more complete understanding of the present disclosure and advantages thereof may be acquired by referring to the following description taken in conjunction with the accompanying drawings wherein:

FIG. 23 is an illustration of a Web-based user-interface and embodiment of the present invention.

Figure 1:
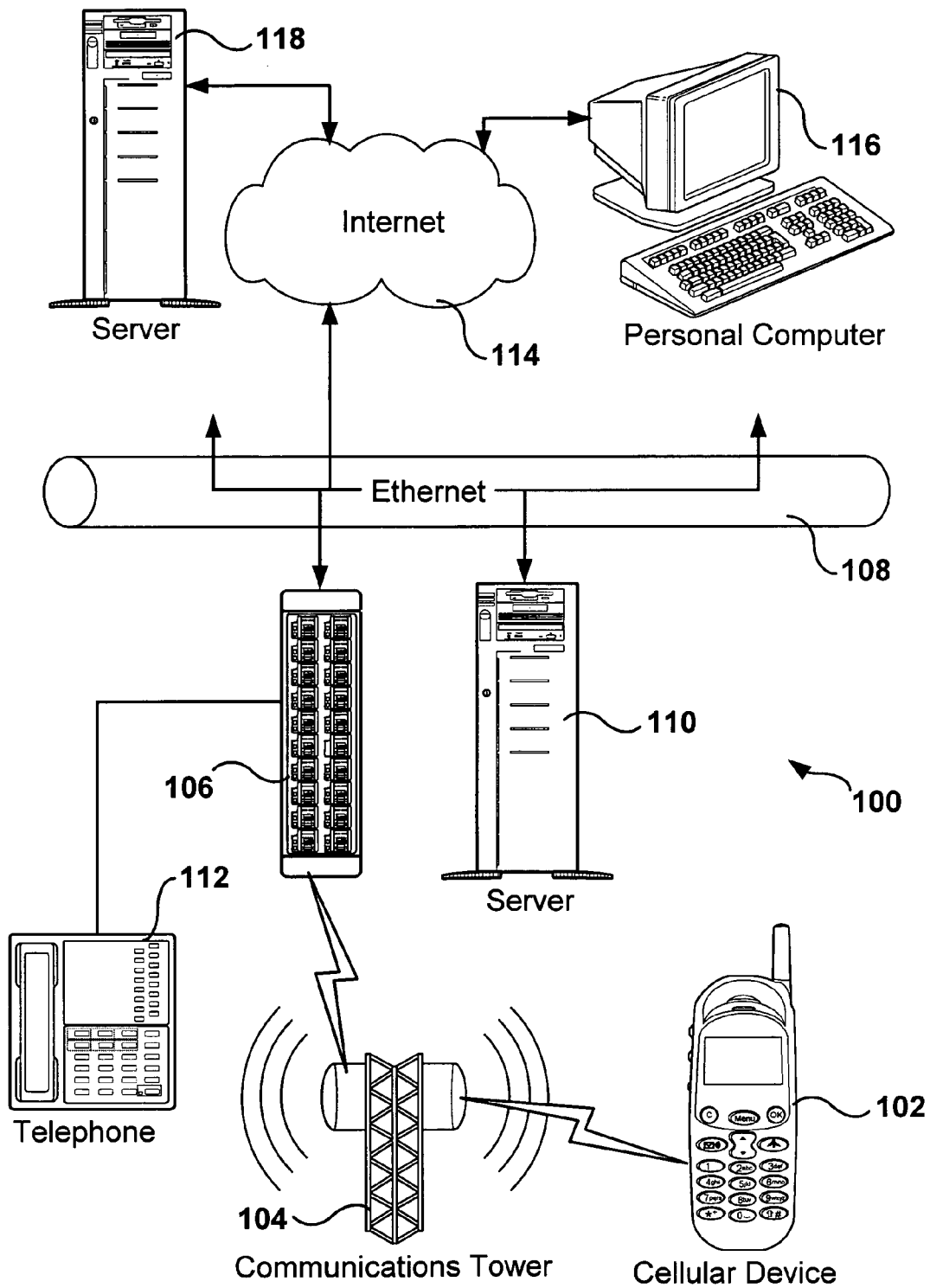
FIG. 1 is a diagram of the system of the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention, as defined by the appended claims, are to be covered.

DETAILED DESCRIPTION OF SPECIFIC EMBODIMENTS

Outline
  Overall System Configuration

The overall system of the present invention is illustrated in FIG. 1. The system 100 has a cellular device, such as a cellular telephone 102, personal digital assistant, or the like, that is connected to a telecommunications system, such as communications tower 104. The communications tower 104, in turn, is operatively connected to PBX 106 or other telecommunications equipment necessary to receive, send, and route incoming and outgoing signals. In the preferred embodiment, the PBX 106 or similar devices are connected to a local area network, such as Ethernet 108. The local area network 108 in turn facilitates operative connection to a server 110 and a wide area network, such as the Internet 114. The PBX 106 also provides operative connection to one or more landline telephones 112 and other similar devices. Internet connectivity provides the ability for the server 110 to communicate with one or more other servers 118 or client devices 116.

Client Devices
  Type and Description

Figure 2:
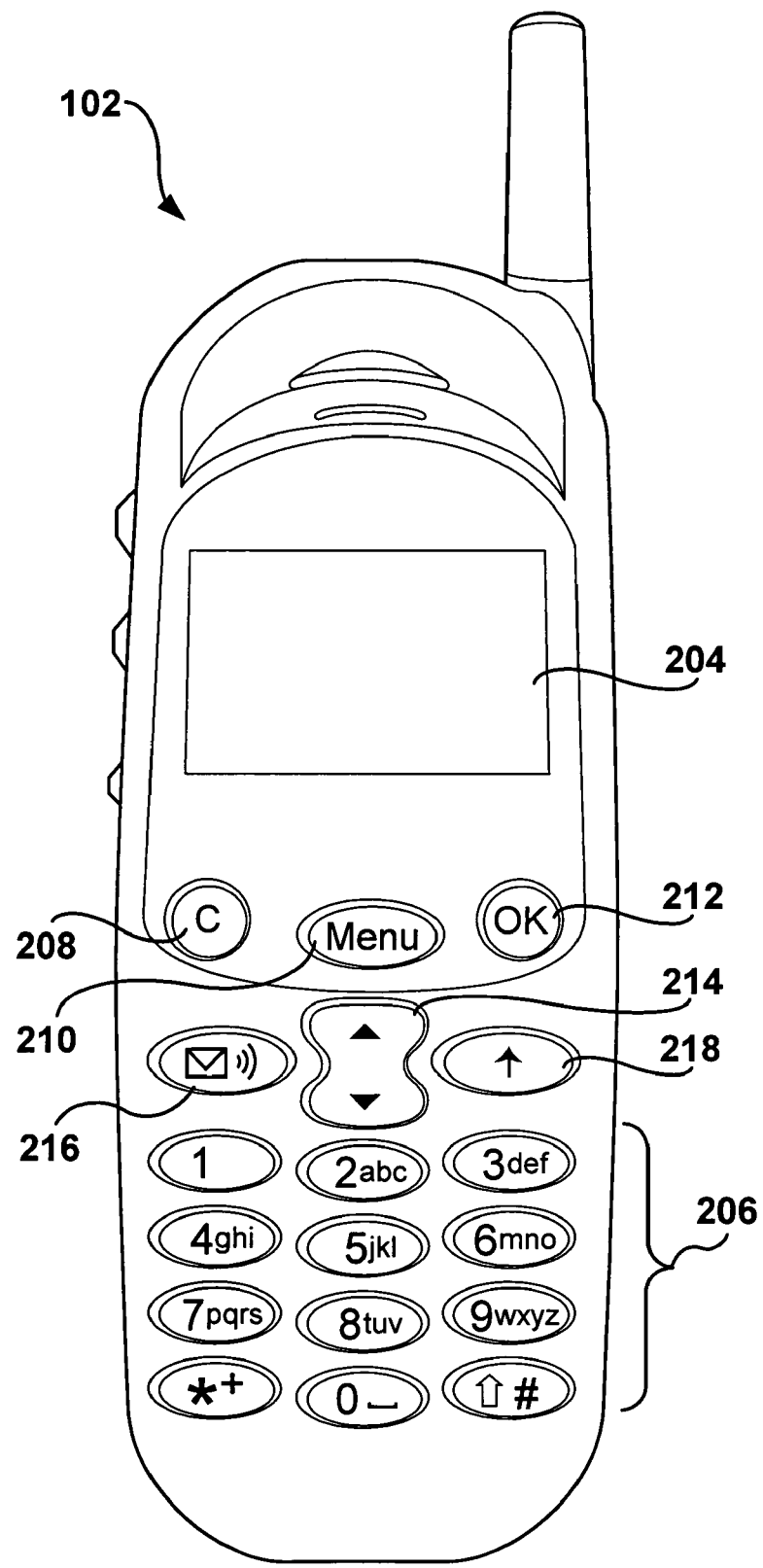
FIG. 2 illustrates a client device that is capable of communicating with the system of the present invention.

FIG. 2 illustrates the human interface of a typical client device for use in conjunction with the present invention. The client device 102 preferably has a display 204 that can be used to display textual and/or graphical information, such as date 206, time 208, battery status 210, and menu information 210. The client devices/software applications can include (but are not limited to): 3G mobile phones, personal computers ("PC"), connectivity (physical layer) devices having one or more protocols, software processes (on clients and/or servers), and server devices.

The present invention provides a bridging mechanism between wide-area networks, such as the Internet, to telecommunication systems, such as local and long-distance telephone service. The present invention also enables standard telephone devices, such as a telephone, a cellular hand-held telephone, or similar devices, to access content on the Internet or to cause actions to other systems via local-area or wide-area networks such as the Internet. The present invention also provides the capability of extending a current telephone network by utilizing technology, such as voice over IP ("VoIP") and similar technologies, to communicate with other individuals in ways that would not be possible without the enhanced telephone network capabilities of the present invention.

Today many devices are used to handle various communication transactions between users and organizations. For example, there are telephones, cellular phones, computers, and personal digital assistants (known as "PDA's"). As a result of the multitude of devices needed, many accounts are also created to take care of essential information regarding the billing for transactions, as well as the various addresses used by the devices, such as phones numbers, e-mail addresses, URLs and the like. Moreover, companies must create several built-for-device mechanisms for handling transactions by the user's device (such as voice-mail, email servers, etc.). Moreover, the user constantly needs to synchronize information between the various devices. Consequently, user devices at this point have a limited capability. Further, currently there is no smart device to help with the updating of calendars, which now must be done manually. There is no way to leave voice mail non-intrusively or in a user-friendly manner. Moreover, current devices have a primitive user interface. For example, there are voice menu systems for cellular devices that are often tedious, and is usually forgotten by the user has reached the end of the menu. Moreover, information in text-only form for review by cellular devices is often too small to read or (if condensed) provides too little information.

Users have difficulty getting information from their current set of devices. For example, information is hard to find by typing in cryptic URLs or typing search mechanisms for menu driven applications. Moreover, other devices typically have a slow download of information.

The present invention provides the user with assisted telephony in real-time, via the BaseNet technology, by utilizing a central server that located at the telecommunications company or another provider. The central server extends the functionality of current telephone devices, such as mobile phones, by using the computing capacity of the server to interpret commands and generate context-sensitive menu options. Moreover, the present invention provides automatic transfer of context sensitive information to other individuals or their devices, or to other organizations, in a manner that facilitates transactions without unnecessary intervention by the user. The technology of the present invention provides more functionality, stronger capabilities and higher intelligence than exists in current telephony systems. Moreover, the present invention works with mobile and landline telephones in an equivalent fashion. Thus, uses of landline telephones can obtain the same level of functionality afforded to those with mobile phones. Furthermore, the increased functionality of telephones, when used in conjunction with the system of the present invention, obviates the need for additional devices such as personal digital assistants.

The present invention utilizes resources devoted to the user on a centralized location such as with a telecommunications company, or other for-purpose provider that enables mobile phones and landline phones, personal digital systems and computers to access the same place by any of the major telecommunications and network protocols. Thus, the user need only remember (or convey) a single number sequence that designates the location of the user's phonesite. The phonesite would be accessible to the user and others via, for example, the World Wide Web and through the regular telecommunication system. The features and capabilities of the present invention will be more fully explained through use of an example.

Overview of the Examples

An overview of the various elements that may be included in, or used in conjunction with, the system 100 of the present invention are illustrated in FIG. 1. Central to the phonesite of the present invention is the server 110 that contains one or more processes that implement the phonesite of the present invention. The server 110 is provided with connectivity to client devices by, for example, a local area network (Ethernet) 108 as illustrated in FIG. 1. Other connectivity schemes besides Ethernet can be used with equal effect with the present invention, so long as the alternate connectivity provides sufficient bandwidth and protocol support to satisfy demand. The local area network 108 provides connectivity to, for example, a wide area network 114, such as the Internet, which, in turn, provides connectivity to other servers 118 and personal computers 116. Similarly, the local area network 108 can provide connectivity to a PBX switch 106 that links the local area network 108 to a telecommunications system including, for example, telephone 112, communications tower 104, and cellular device 102. It is intended that the PBX switch 106 (or similar device) be constructed and arranged to perform any translation necessary to enable a packet-switched network, such as the local area network 108, to communicate with telecommunications devices, such as telephone 112 and cellular phone 102. Other configurations of the system outlined in FIG. 1 are also possible with the present invention. For example, a non-packet-switched local area network 108 could be used in conjunction with the telecommunications system. The specific protocol or connectivity mechanism is not important to the operation of the present invention so long as the server 110 is able to communicate with other client or server devices via a mutually supported protocol.

EXAMPLES

The features of the present invention can be illustrated with the following examples. While the example are disclosed for purposes of illustration, it will be understood that these examples are not the only application of the present invention, and that many alternate embodiments and applications for the present invention are possible without departing from the scope and spirit of the appended claims.

The phonesite user is provided with, for example, a subscription to the system of the present invention through, for instance, a telecommunications company that is a phonesite provider. In accordance with the teachings of the present invention, the phonesite provider specifies a unique universal phonesite number. The use can then provide the phonesite number to contacts and organizations for transaction purposes. The information contained within the user's phonesite can be modified via, for example, telephone 112 or a web browser executed on a personal computer 116.

In a typical scenario, the user logs into his or her phonesite via a cellular telephone 102. The display capability of the cellular telephone provides the date and time as well as the phonesite number. FIG. 2 illustrates a typical cellular telephone having text/graphics display 204, alphanumeric buttons 206, and control buttons 208, 210, 212, 214, 216, and 218. The text/graphics display 204 is intended to provide either textual and/or graphical information to the user. The display 204 may be black and white, or it may include grayscale and color information.

Figure 3:
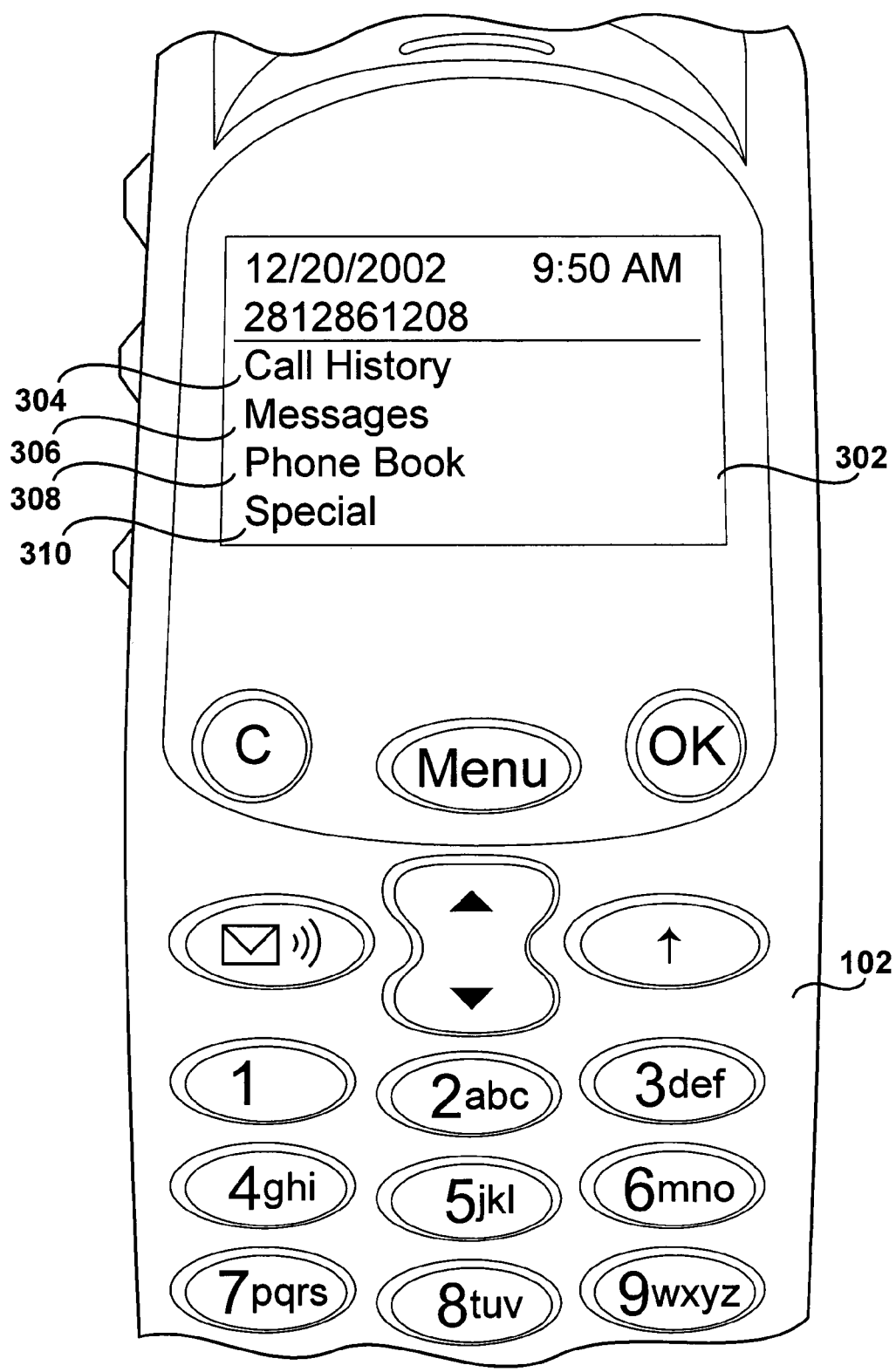
FIG. 3 illustrates the display of menu options according to the teachings of the present invention.
Figure 4:
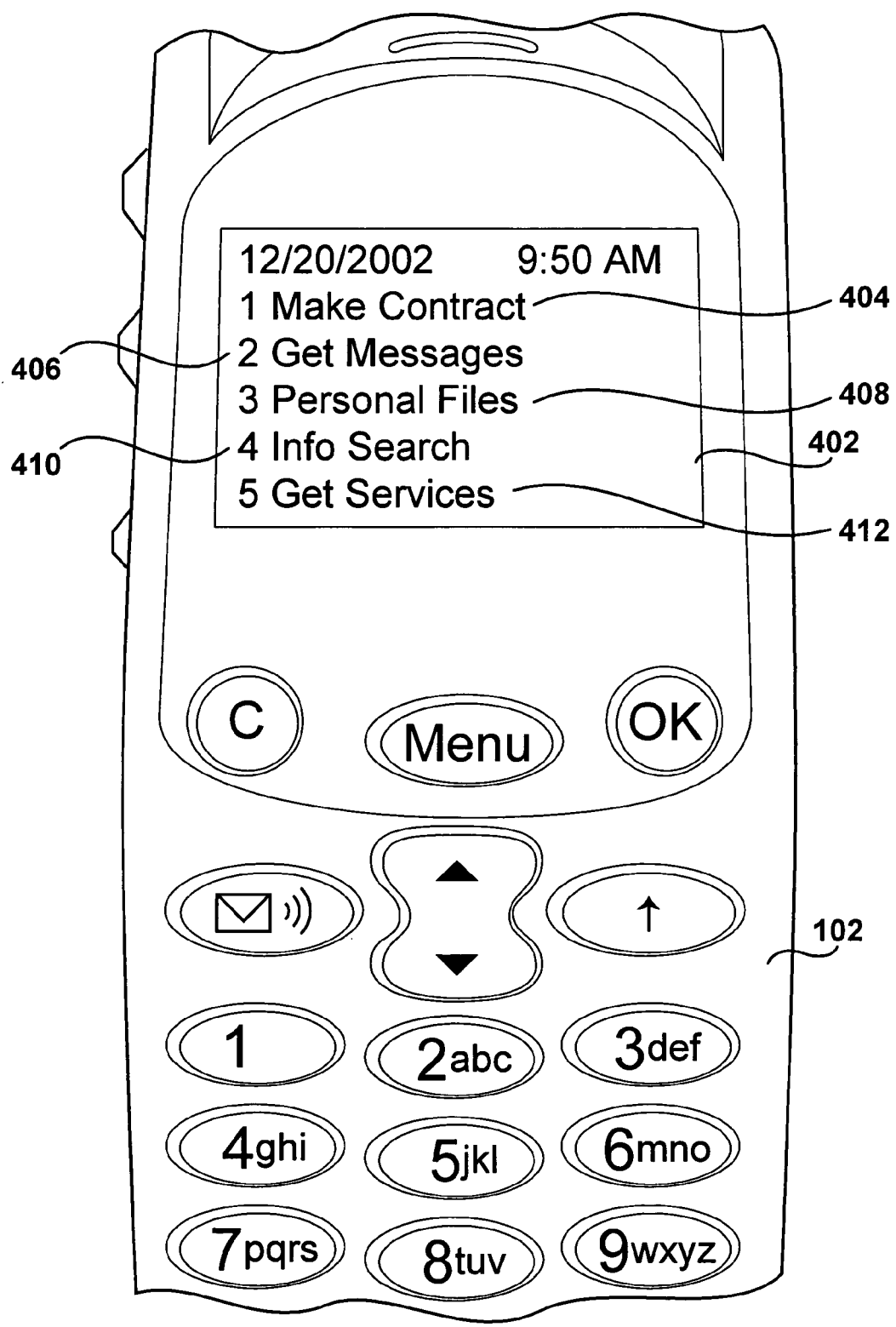
FIG. 4 illustrates the display of menu options according to the teachings of the present invention.

The menu-generation capability of the present invention is illustrated in FIG. 3, where the cellular telephone device 102 has a display 302. The menu disclosed in the display 302 includes the menu item for the call history 304, messages 306, phonebook 308 and special features 310. At this point, the user can select any of the contact items simply by pressing a number on the keypad 206 that corresponds to the menu item. The user can select, for example, the internal home page of the phonesite system in the present invention as illustrated in FIG. 4. Referring to FIG. 4, the user's cellular device 102 now has display 402 that includes new menu items such as making contact 404 with someone (or some automated process), getting messages 406, review and other personal files 408, conduct information search 410, and get services 412. Referring again to FIG. 4, the menu system encompassed within the present invention provides a great deal of functionality to the user. For example, making contacts 404 can bring up a number of search categories such as finding the individual by name, by telephone number or other search methodologies. Moreover, a similar search can be conducted via menu by pressing menu number 4 (info search 410) with the keypad 206, or by voice activation, i.e. saying "four". Thus, the present invention provides multiple ways to get the same information, enabling the user to obtain the information in the user's preferred manner. Finally, the menu system of the present invention is made to facilitate standard user-functionality without undue experimentation or keystroking by the user.

Figure 5:
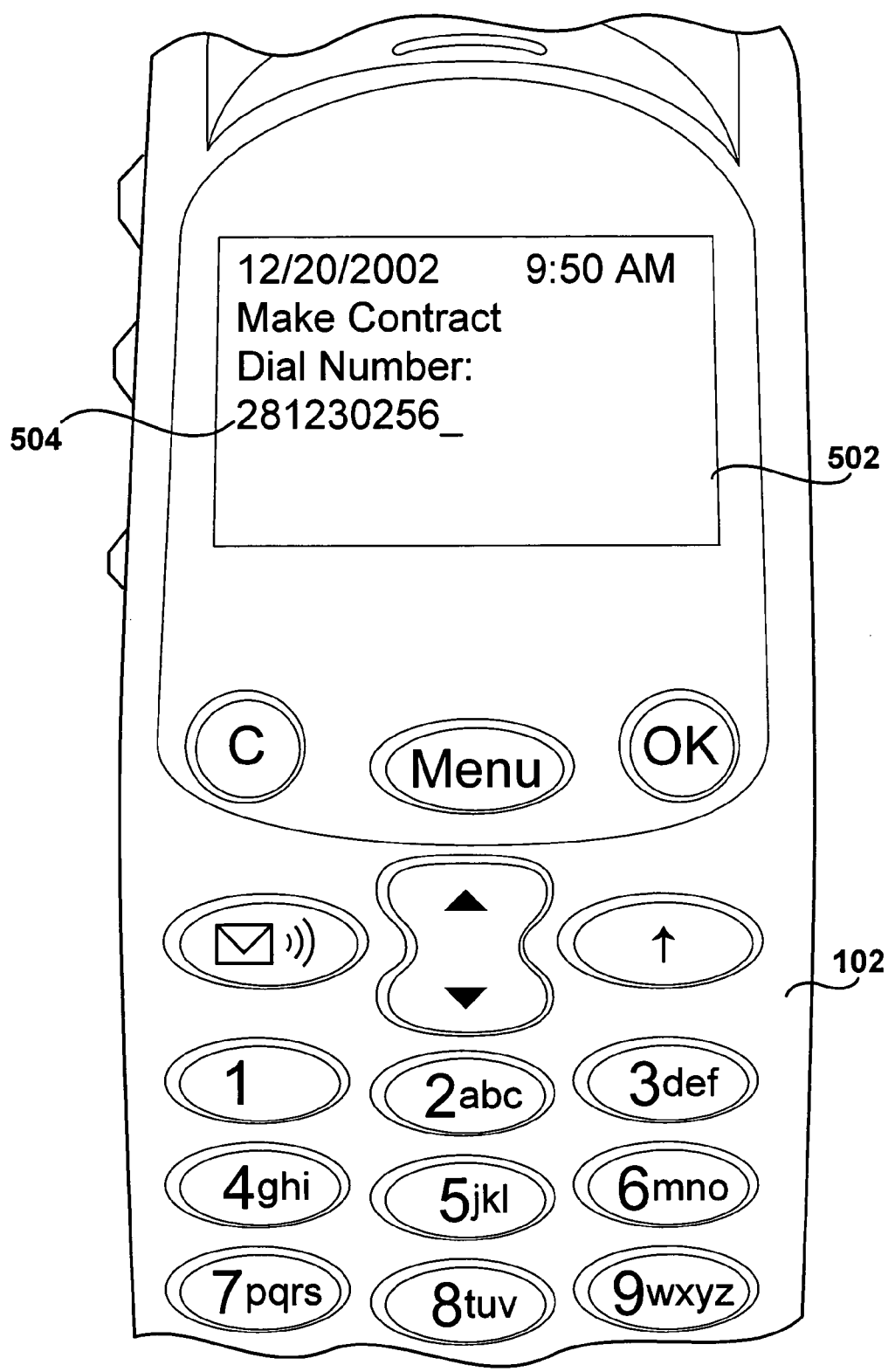
FIG. 5 illustrates the display of information according to the teachings of the present invention.
Figure 6:
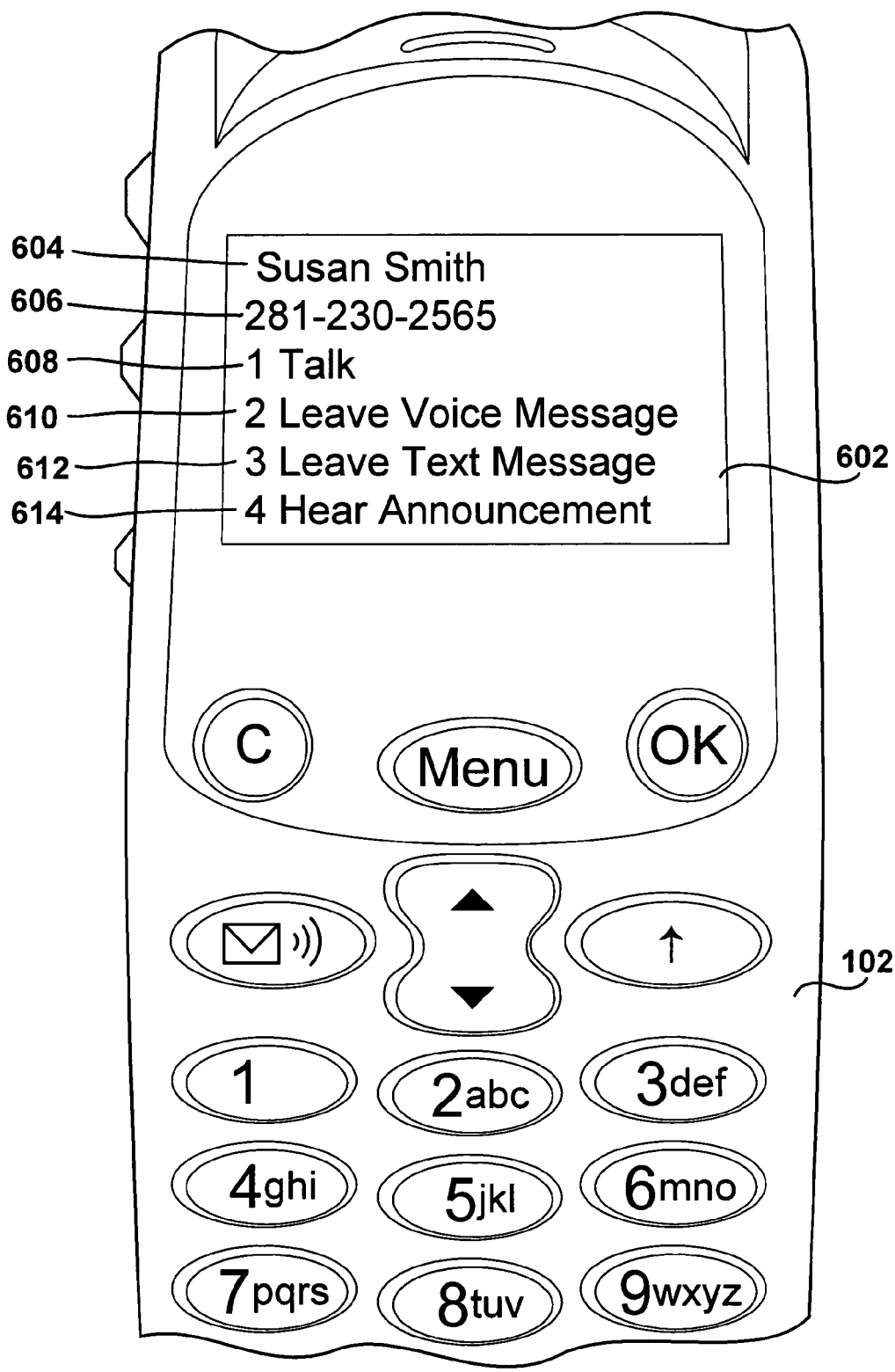
FIG. 6 illustrates the display of information according to the teachings of the present invention.

FIG. 5 illustrates a typical contact scenario envisioned within the teachings of the present invention. Referring to FIG. 5, the cellular phone 102 has display 502 that includes the contact number 504. In this scenario, the user wishes to dial the particular contact number 504. Other ways to obtain the contact information such as a search or via voice command can also be made with the present invention as explained previously. In the scenario of FIG. 5, the user phones a particular person. However, instead of establishing a connection specifically with the user, the user telephones the other person's phonesite, either via the user own phonesite, or be dialing directly into the other person's phonesite. Upon connection with the other person's phonesite, the user is provided with a menu as predefined by the other person. For example, according to FIG. 6, the user's cell phone 102 displays a menu selection that is provided by the other user's phonesite, which indicates the other user's name 604, the other user's phonesite number 606, as well as menu items for talking directly to the person (talk 608), leaving a voicemail message 610, leaving a text message 612, and listening to announcements 614. Use of phonesite to phonesite connection is encouraged because if the other user's phonesite knows that a user's phonesite is contacting it, then user-specific information (delineated by the user) can be provided to the user's phonesite automatically. For example, the other person can provide tailored menu and/or specific textual messages or applications for specific contacts. Business contacts can receive one set of menu options. Personal contacts another set. Family members yet another set, and so on. Finally, tailored menu items may be provided to the user's phonesite and thus to the user his/herself on cell phone 102. Similarly, users may delineate what information is provided to another person's phonesite automatically.

Figure 7:
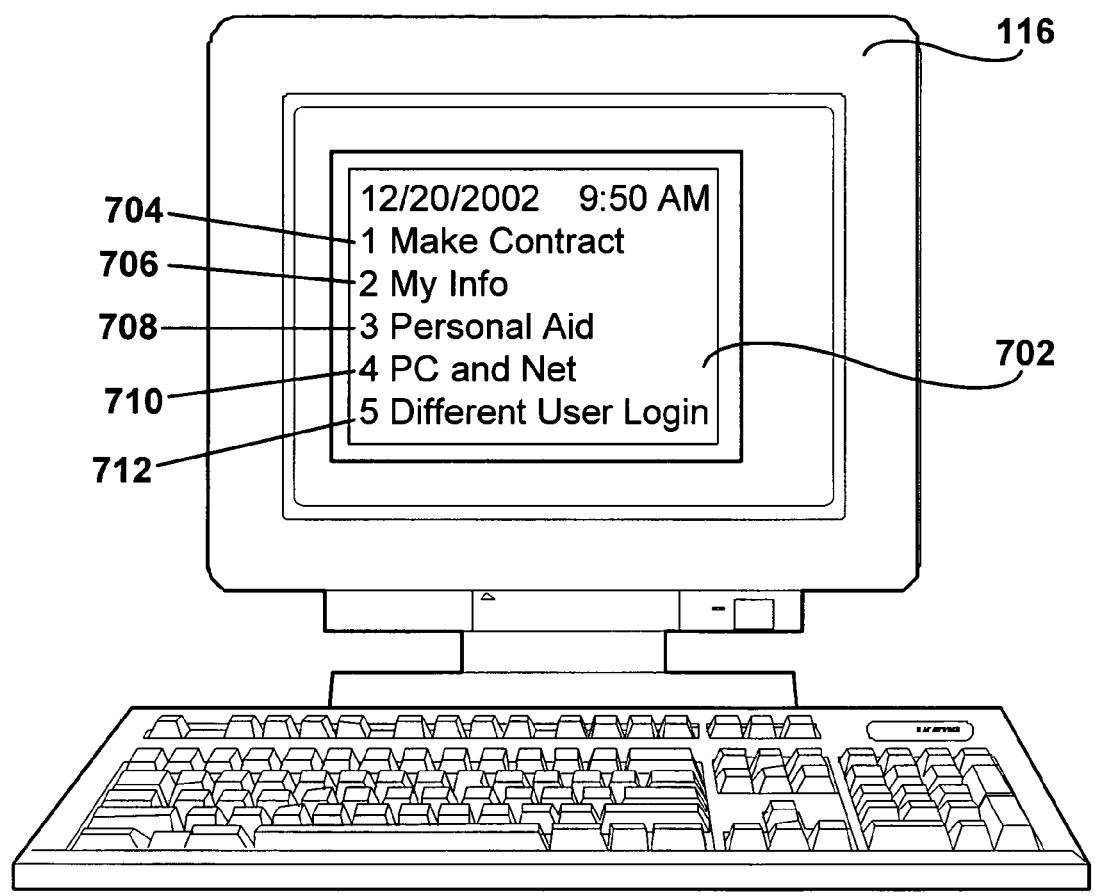
FIG. 7 illustrates the display of information according to the teachings of the present invention.

Another feature of the present invention is illustrated in FIG. 7. For example, the user may access his or her phonesite via personal computer 116. The personal computer 116 can access via, for example, the worldwide web of the Internet, special dial-up connect, virtual private network, or the like. Access via the Internet could utilize a home page 702 for the user's phonesite, the personal computer would then display menu items 704-712 including, for example, the date and time. The menu items could duplicate or supplement menu items available via the user's cell phone 102. Typical menu items consist of, for example, make contact 704, my information 706, personal aid 708, PC on the Internet 710 and different user login 712 options. Other type of menus and related selections are, of course, available to the user in a variety of formats. For example, the user may tailor a set of menu items specifically when accessing the phonesite via the World Wide Web, while providing the same or dissimilar menu items if accessing the phonesite via, a cellular phone 102 or personal digital assistant or the like. Similarly, the home page menus can be adjusted by the user to display different options or items for others who access his phone site so that business contacts see one home page, friends another, and family members yet another home page.

Figure 8:
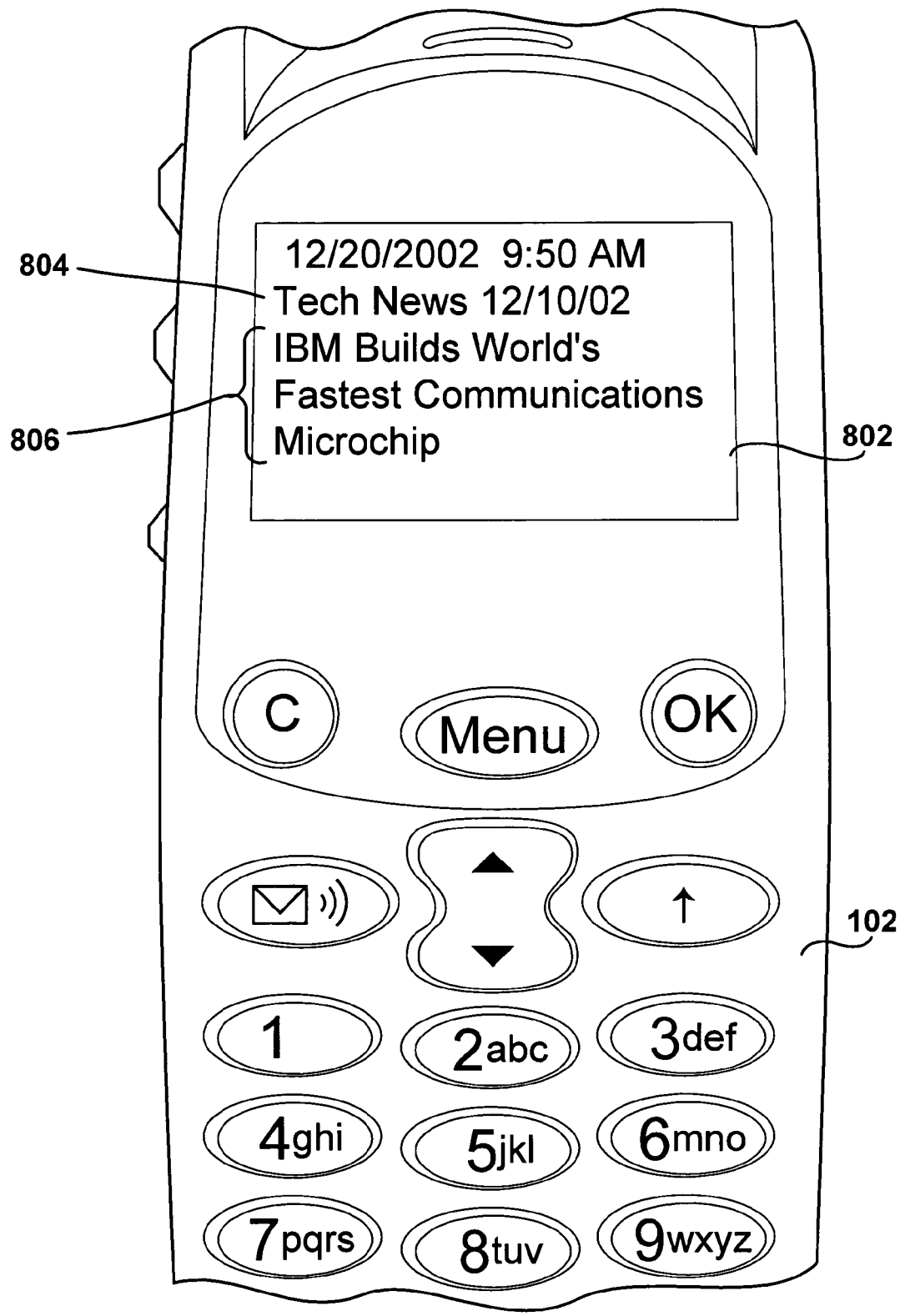
FIG. 8 illustrates the display of information according to the teachings of the present invention.
Figure 9:
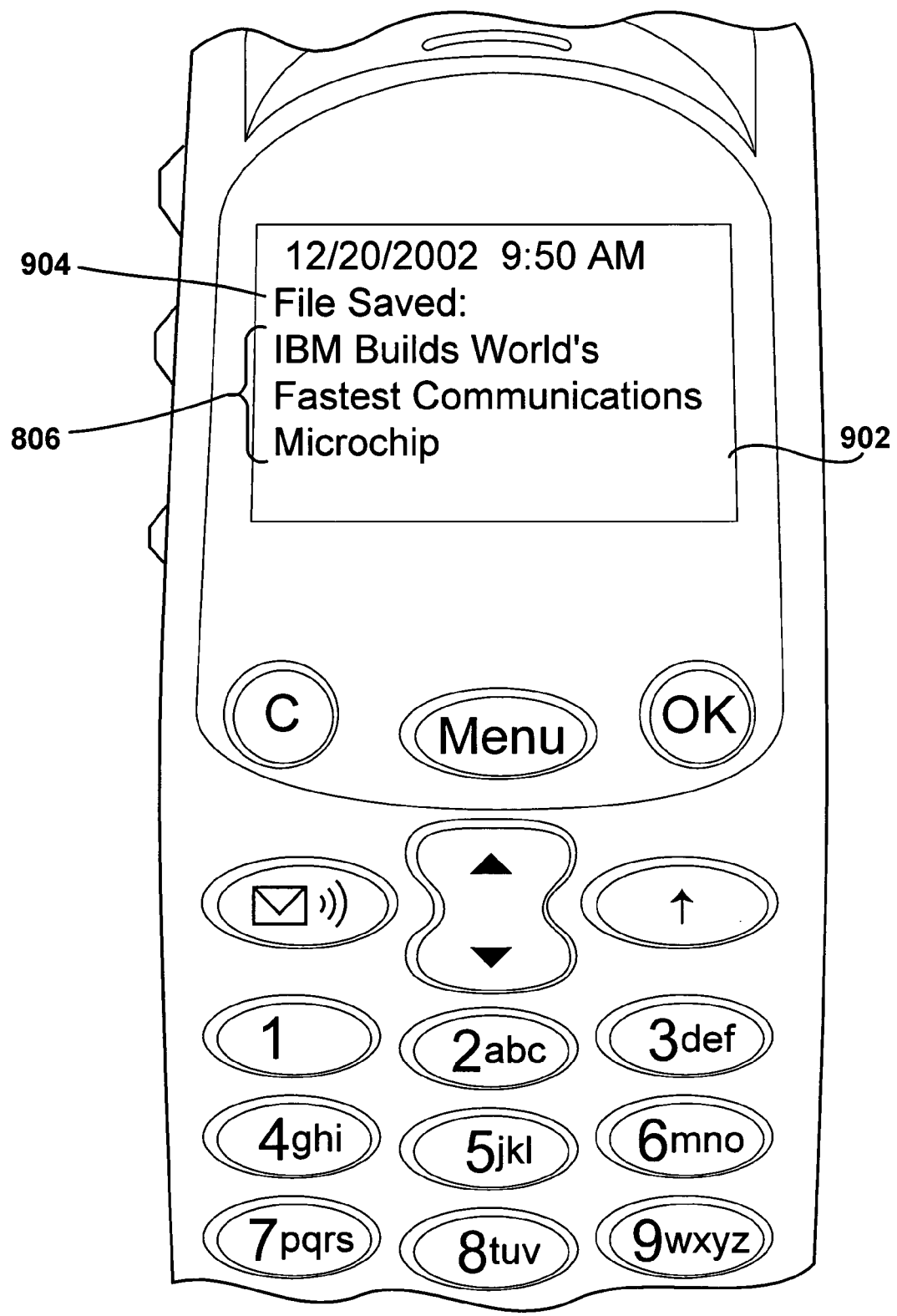
FIG. 9 illustrates the display of information according to the teachings of the present invention.

FIG. 8 illustrates the ability to obtain synchronized voice and text information via the phonesite of the present invention. In this example, the user is using a cellular telephone 102 to render display 802 that contains the date and time, the identification of the menu item or news source 804 (in this case, Tech News), as well as information regarding the news story 806. In the case of the download of news information, FIG. 9 illustrates another feature of the present invention, namely the contact sensitive and actions that can be made. In the example of FIG. 9, the news story viewed in FIG. 8 can be saved for future use (such as forwarding or archiving). Referring to FIG. 9, the user saves 904 the downloaded information that is displayed on the screen 902. The saved information can be on the user's PC 116, or the server 110 that hosts the user's phonesite, or another device connected to the system 100.

The server 110 can facilitate the conversion of text messages into voice messages and vice-a-versa for access to the particular message from any device on the system 100. For example, text information may be supplied to the phonesite by a news feed or meerkat process to the phonesite that is then distributed to the user after conversion into an audio format. Similarly, voice messages such as to the user from a cellular phone, can be converted into a text message for reading via the worldwide web. The voice text messages can be made available to a cellular phone 102 in, for example, a combined menu 1002 as illustrated in FIG. 10.

Figure 10:
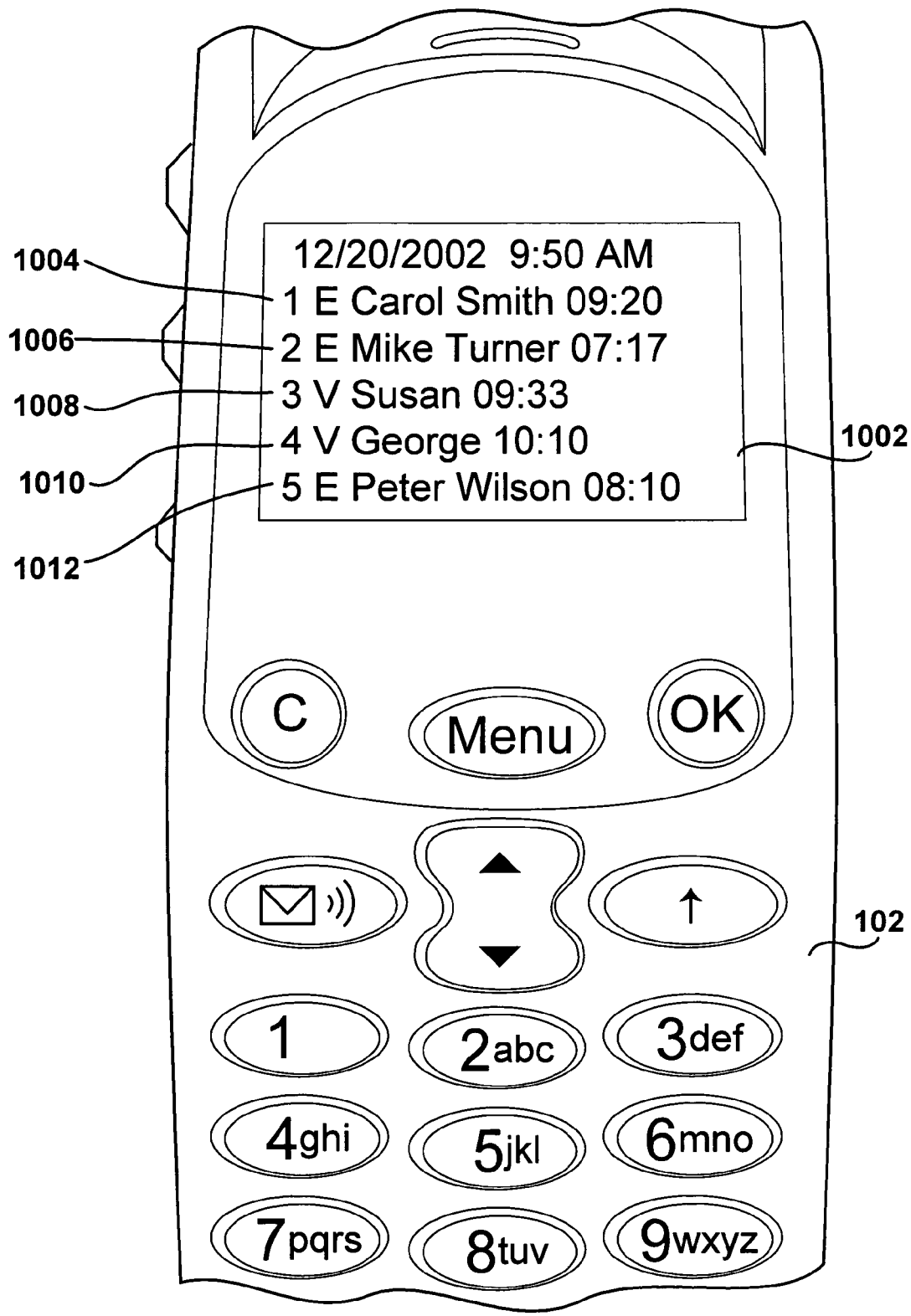
FIG. 10 illustrates the display of information according to the teachings of the present invention.
Figure 11:
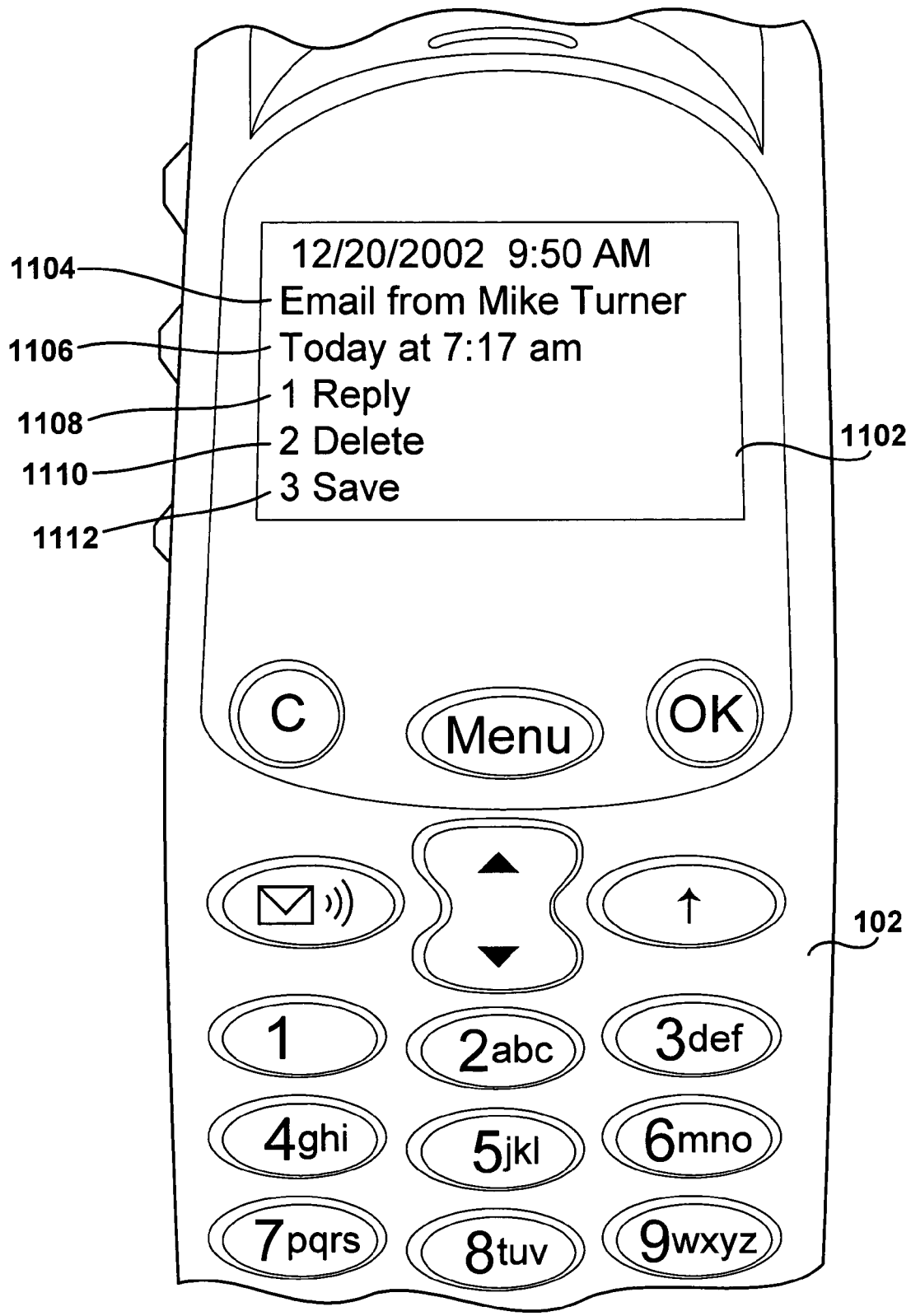
FIG. 11 illustrates the display of information according to the teachings of the present invention.

As shown in FIG. 10, the cell phone 102 has displayed 1002 that contains many messages 1004, 1006, 1008, 1010 and 1012, from which the user may select by using the buttons on the 206 on the cell phone 102, or by, for example, voice command input into the cellular phone 102. In this example, the user elects to listen to an e-mail message as illustrated in FIG. 11. After listening to the e-mail message (that was converted into audio format by server 110), the user may then elect to reply to the e-mail message (in either text and/or audio format), delete the e-mail message or save the e-mail message for later consideration. Other options, such as forwarding the message, or reply-to-all, can be added to the menu items and accessed using one of the control buttons 206. The display 1102 of FIG. 11 shows the cell phone 102 displaying specifics about the e-mail 1104, such as names and the date-time stamp 1006, as well as menu options reply 1108, delete 1110 and save 1112.

Figure 12:
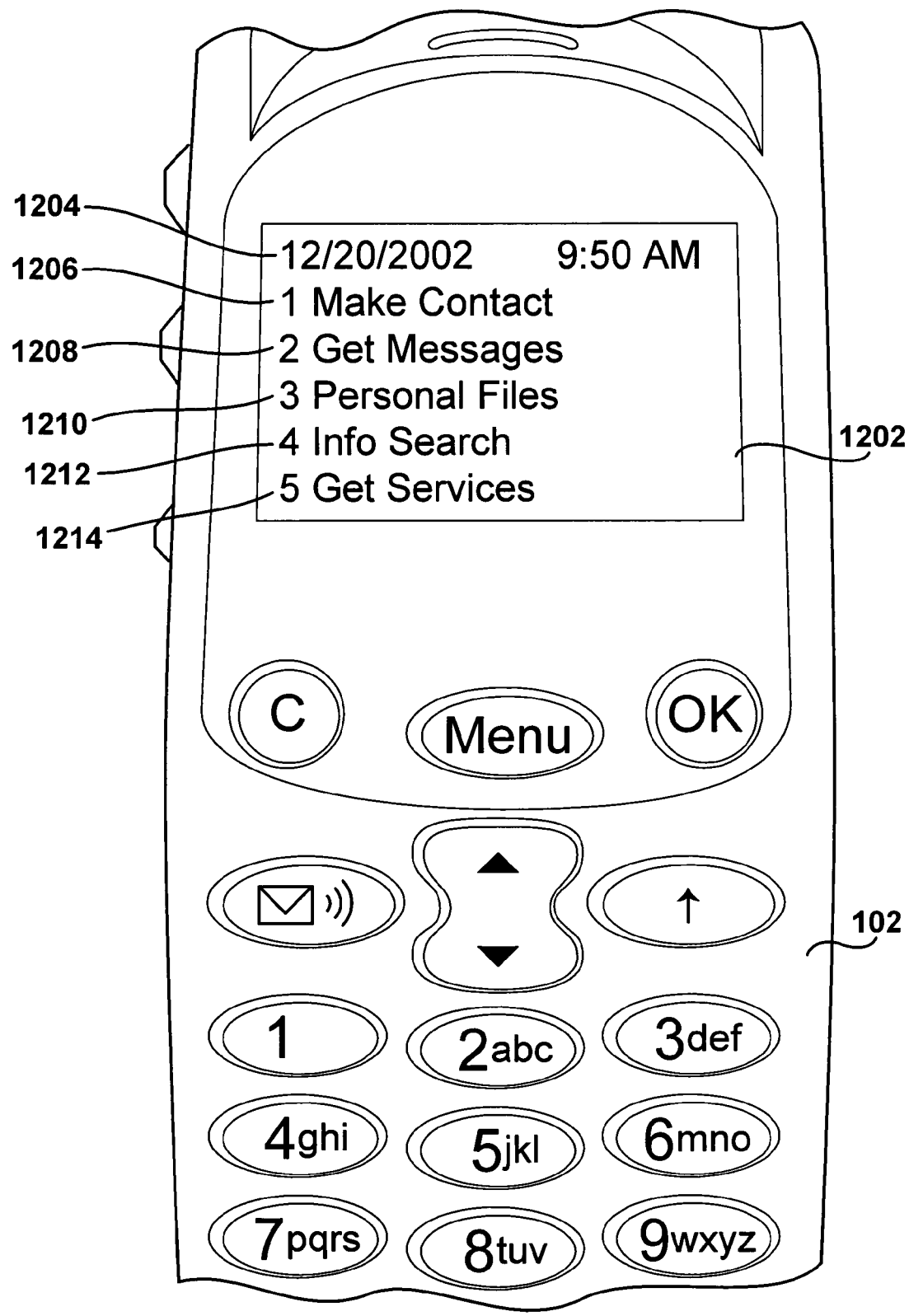
FIG. 12 illustrates the display of information according to the teachings of the present invention.
Figure 13:
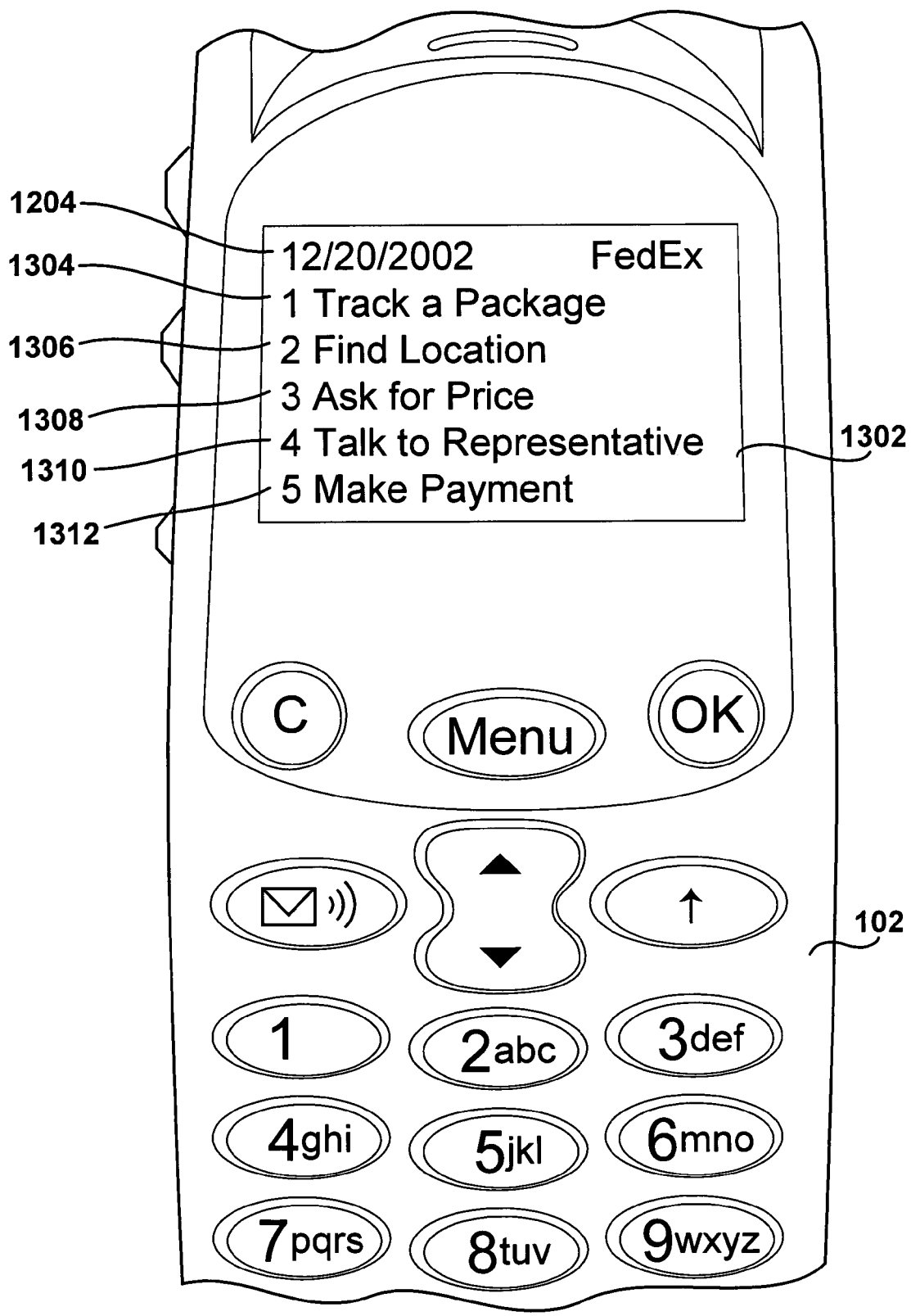
FIG. 13 illustrates the display of information according to the teachings of the present invention.
Figure 14:
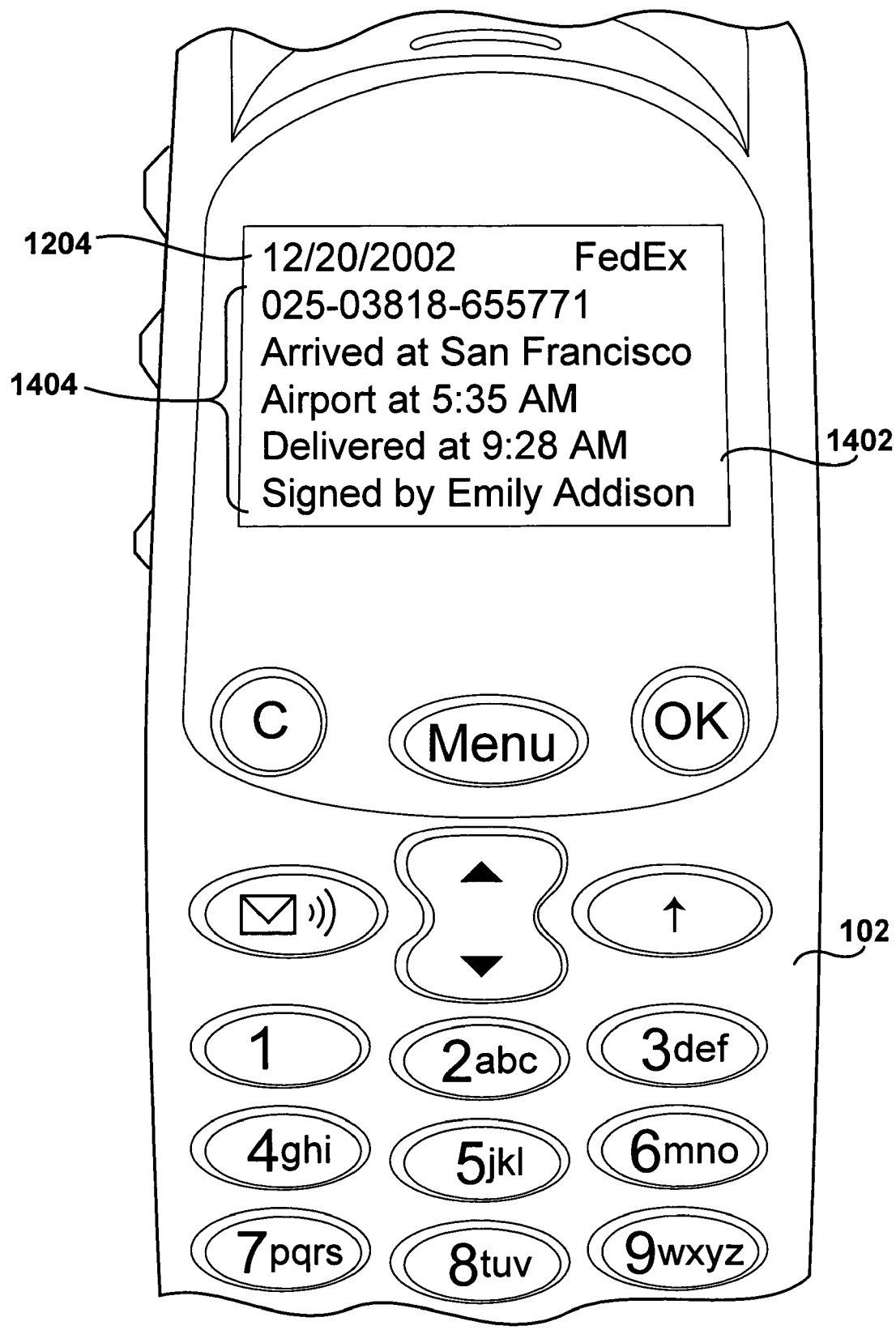
FIG. 14 illustrates the display of information according to the teachings of the present invention.

In yet another application of the present invention, the user calls a third party organization such as a shipping company to inquire upon the status of a parcel sent by the user. Assuming that the arrangements for the transportation of the parcel was facilitated through the phonesites of both the user and the shipping organization, significant amounts of information can be transferred between the two parties automatically. For example, the user may select the get services option 1214 (see FIG. 12) for voice dialing without the need for a number. For example, upon selection of the get services menu item 1214, the user would simply mention the name of the shipping company to establish contact with the phonesite of the shipping company. The phonesite of the shipping company could then provide to the phonesite user the menu displayed in FIG. 13. Referring to FIG. 13 the user's cell phone 102 has displayed 1302 showing the date and time stamp 1204 as well as menu selections track a package 1304, find a location 1306, ask for a price 1308, contact to a representative 1310, and make a payment 1312, any of which the user may select through the key pad 206 or voice activation. Recall that the establishment of the connection via the user's phonesite enables the inclusion of the user's shipping-specific information to the shipping company's phonesite. Such shipping-specific information may include, among other thins, the phonesite user's identification information such as name and such and phonesite number. Prompted by the user's information, the shipping company could then automatically look-up in its own shipping database tables all of the records regarding any packages sent by the particular user. If a package shows up on the shipping company's SQL (or other) query, for example, that information can be transmitted to the user's phonesite which in turn generates an appropriate menu and delivers that menu to the user's cell phone 102 or PC 116 as illustrated in FIG. 14. Similarly, depending on however many packages or what services the third party company provided, a menu item can be forwarded to the phonesite user. Referring back to FIG. 14, the shipping company can display on the user's text display 1402 (and/or audio feature) of cellular phone 102, information 1404, which may include, for example, the shipping number, where the package arrived, when it arrived at an airport, when it was delivered and who signed for it.

Figure 15:
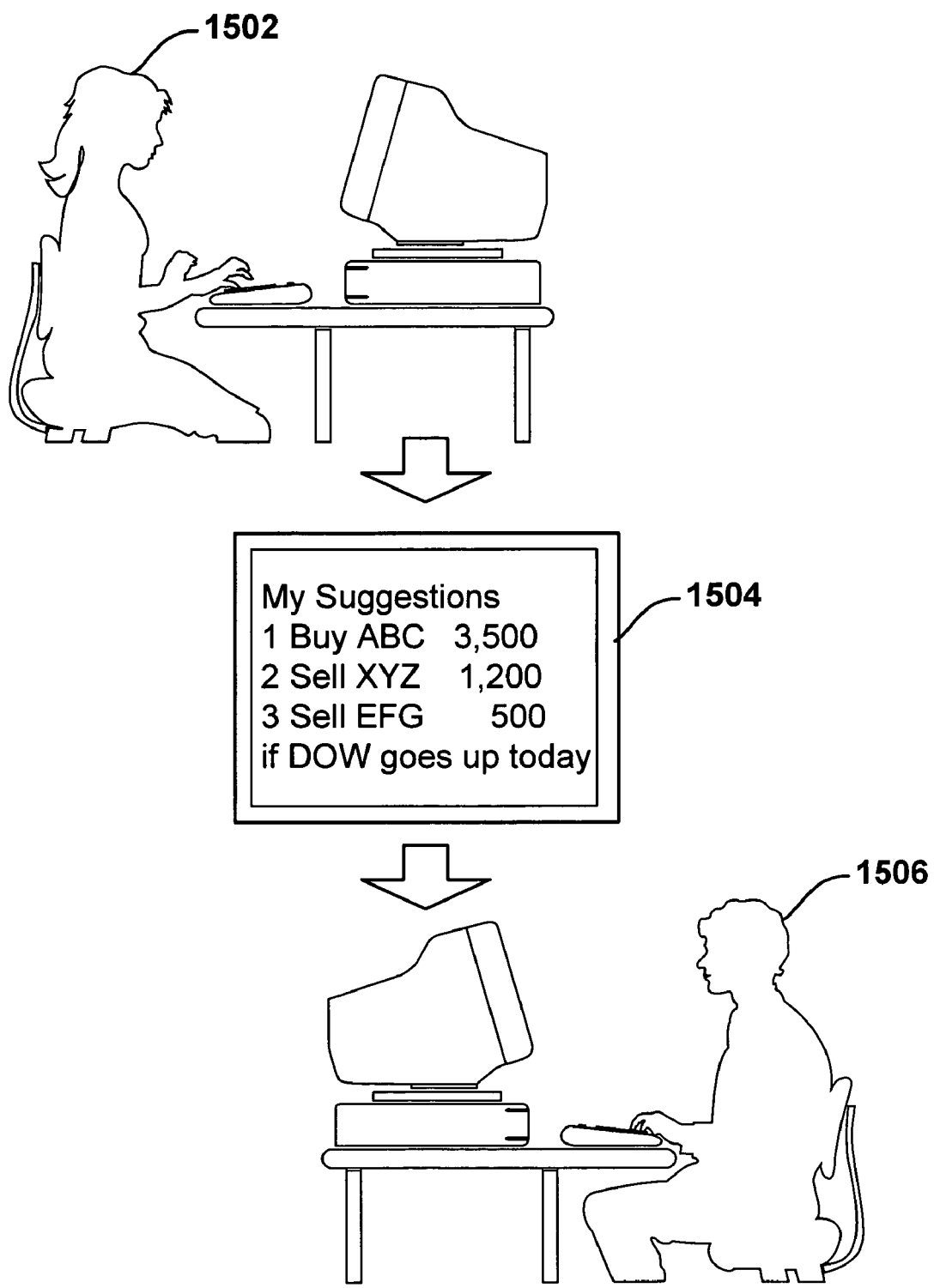
FIG. 15 illustrates the conveyance of information according to the teachings of the present invention.

Other types of information can be conveyed to the user in audio, textual, or other formats. For example, referring to FIG. 15 a broker 102 can sit at a PC 116, and type in suggestions in a standard menu format 1504, that can be transmitted to the user 1506, as illustrated in FIG. 15. Textual messages from, for example, the broker can keep the user informed for better investment decisions. The menu items can be acted upon by the user simply by pressing the appropriate key on the keyboard of the PC 116, or with the key pad 206 of cellular phone 102, or another device.

Figure 16:
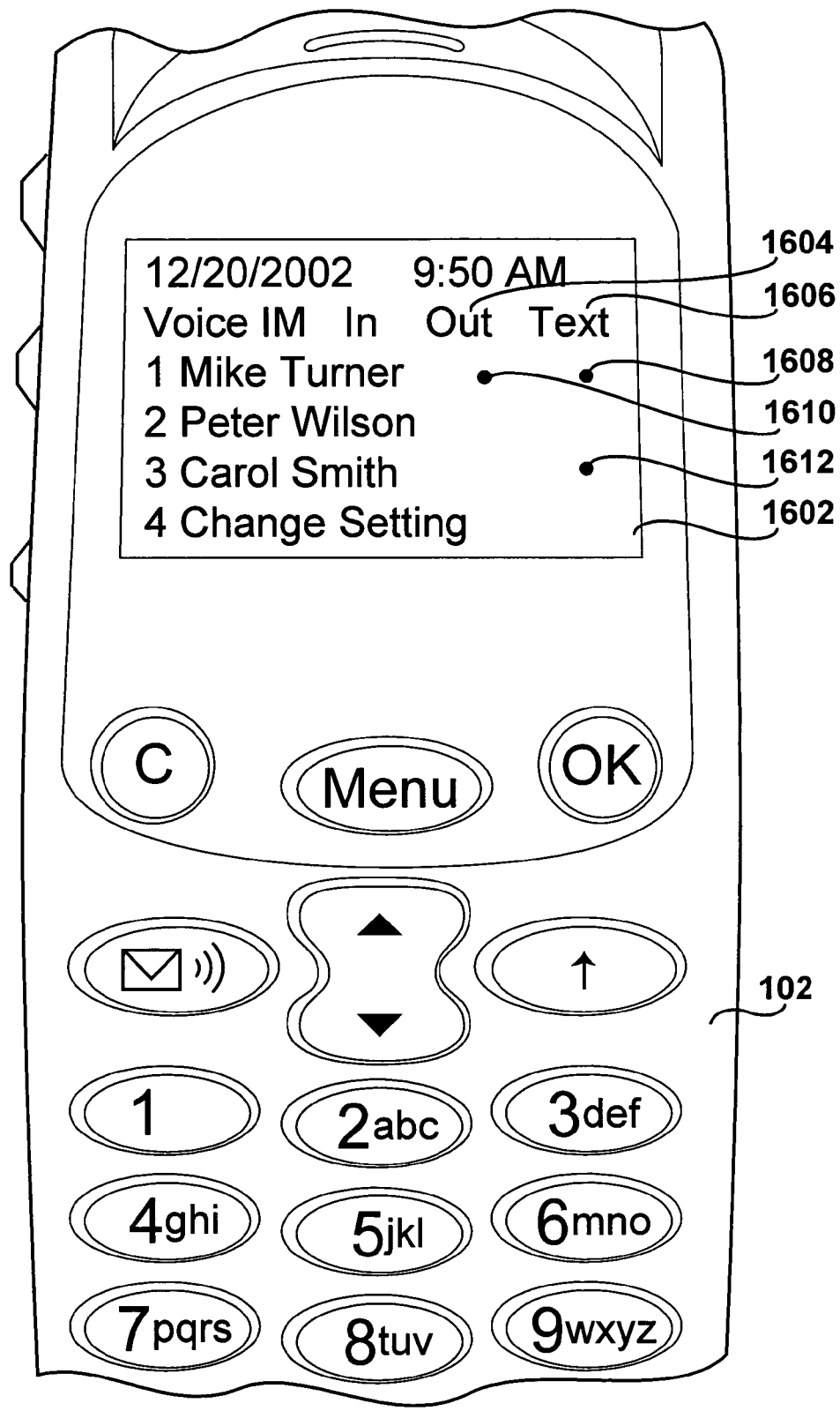
FIG. 16 illustrates the display of information according to the teachings of the present invention.

The present invention also enhances the ability to conduct instant messaging. Referring to FIG. 16, the cellular phone 102 has display 1602 wherein the various people who are connected to the instant messaging are displayed in menu items 1 through 4 of display 1602 as well as indications whether the person is out 1604 or whether a person is accepting text messages 1606. For example, menu item 1 shows that that particular person is unavailable, as indicated by dot 1610, but that person is accepting text messages, as indicated by dot 1608. Similarly, there is a third person on the list of people who is also accepting text messages, as indicated by dot 1612.

Figure 17:
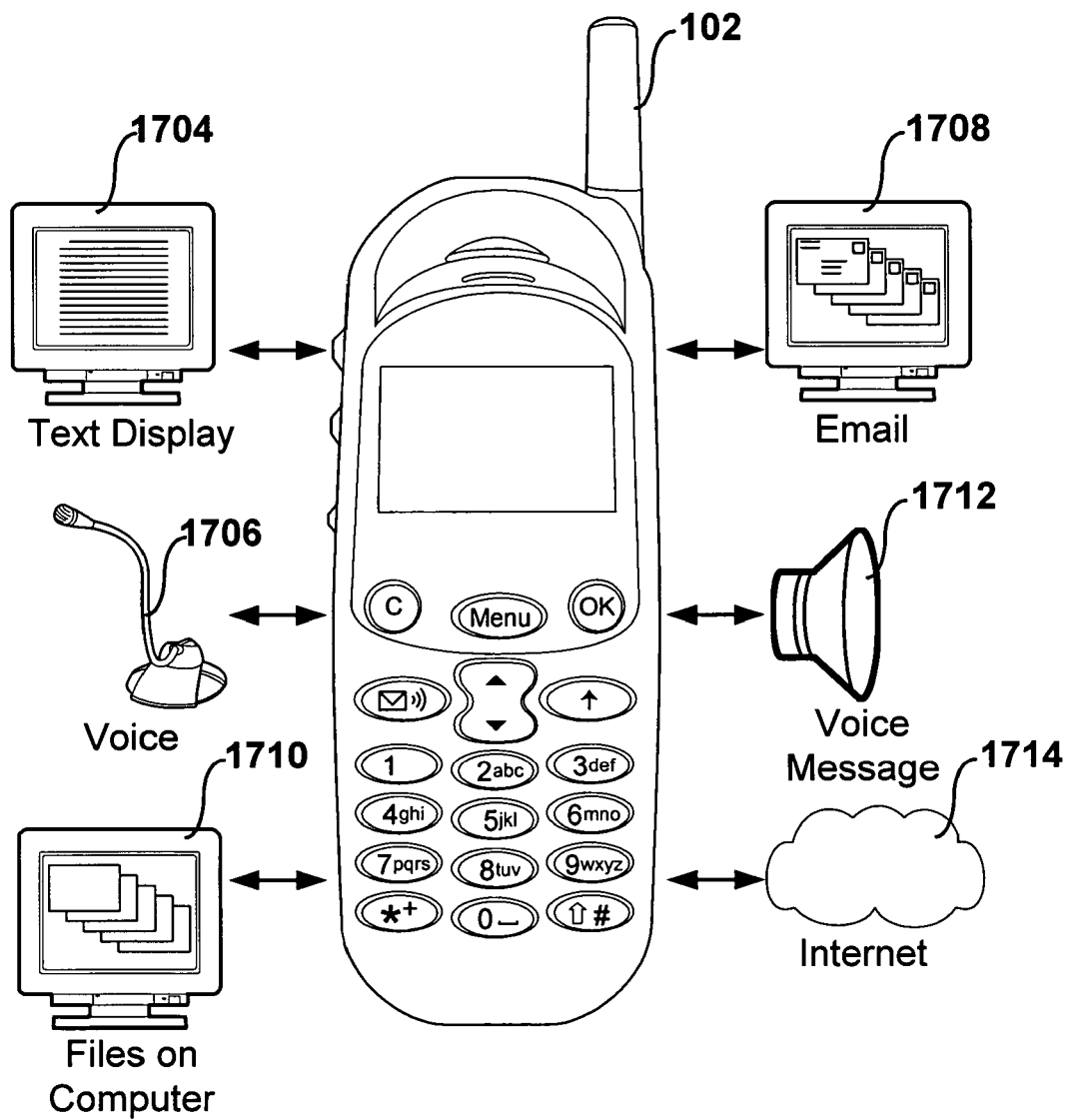
FIG. 17 illustrates the variety of communications formats and transmission mechanisms available for use with the present invention.

FIG. 17 illustrates the unified messaging capabilities through for example a cellular phone 102, text displays 1702 as well as voice messaging 1704 as well as files and computers 116 are available to the device 102, similarly, e-mail messages 1708, voice messages through a land line telephone 112, as well as the information from the internet 114 are all accessible through the device 102 as illustrated in FIG. 17. Information, such as from a secretary, family members and such, can be similarly output and provided to the user from the user's phonesite. Information conveyed into the user's phonesite is accessible via, for example, the worldwide web, personal digital assistants such as a personal digital assistant, or via cellular phone 102. Moreover, the information can be received/sent through a variety of formats, such as text display 1704, voice 1706, electronic files 1710, email 1708, voice message 1712, or network signal 1714 as illustrated in FIG. 17. The present invention is also intended to work with a variety of communication protocols including, but not limited to, voice instant messaging, SMTP, TCP/IP, POP, etc.

Personal Base

The server side system of the phonesite of the present invention utilizes a "personal base" of operations. The personal base of the present invention provides the Internet or other wide area network an infrastructural enhancement that facilitates an individual-centric personal base paradigm. Specifically, the present invention provides a structure having multiple layers, multiple nodes, and interactive software to act as a network agent that represents and serves individuals and organizations on wireless networks, local area networks and wide area networks such as the Internet or wide area networks. The present invention optionally includes a database and associated database engine along with multiple interfaces that can perform a variety of tasks.

The preferred embodiment of the present invention includes a personal base, which is a software process that has a persistent presence on a wide area network, such as the Internet. The personal base can be a process running in conjunction with a personal base server (that can handle the interactions between multiple personal bases). The personal base itself normally interacts with a single personal base server but can also interact with the user's input devices such as a personal computer, personal digital assistant, telephone, or other suitable device. The personal base may optionally be equipped with a database and database engine and/or other storage media for storing information that the user designates be saved and be accessible from the personal base. These features enable the personal base to act as a persistent network agent to perform various tasks for or on behalf of the user.

An alternate embodiment of the present invention merges the interface capability of the personal base server into the personal base to form an independent or enhanced personal base. The independent personal base is thus equipped to perform all interface functions without the need for a separate personal base server. This embodiment is useful when the personal base is embedded into a purpose-built device, such as a cellular telephone, that can maintain a constant connection to a network, such as a telecommunications network, from which information may be transmitted to the user or tasks may be performed on behalf of the user.

Alternate embodiments of the present invention include higher levels of personal bases that are used to create an "organization base" or "company base." Company bases can be used to provide a permanent Internet presence for a business organization or other non-profit organization. The company base can be used to interact with other company bases or personal bases in the same manner as a personal base. For example, a company base can be used to interact with vendor's personal bases for the requisition of supplies. The company base can also interact with the personal bases of employees (for payroll issues) and regulatory agencies (such as the IRS) for tax or workplace compliance issues. The company base can also be a network interface for customers (either retail (personal base) or wholesale (company base)). The company base itself may be made up of an amalgamation of personal bases or other objects having company-specific interfaces to enable the company to have a desirable (emergent) behavior in order to automate many routine functions of the company. Moreover, the company base may also have links to object bases (see below) that further enhance the accounting and management functions of the company. Finally, the company base has the same capability as the personal base to conduct queries, postings, transactions or other functions defined below.

Another alternate embodiment of the present invention includes an object base that extends the personal base to other (non-human) objects such as houses, cars, appliances, livestock, crops, or other forms of real or personal property. The object base can be used to retain, for instance, ownership information, age, condition, etc. Moreover, the object base can be used to interact with government agencies for registration requirements or legal compliance issues. For instance, an object base can be created for an automobile. This object base can retain the registration number of the vehicle. Upon payment of annual fees, the state agency (such as a department of motor vehicles) can interface with the particular object base instance in order to update the registration information. Similarly, a service station can interface with the particular object base instance to update maintenance information and state-required vehicle inspections. Other maintenance related information (such as need for oil changes and periodic maintenance) can be stored in the particular object base instance which can be self-triggered to send a message to the owner (via e-mail or other communications mechanism) as a reminder, or to a governmental agency as a notification that some state-required activity has been accomplished. Alternatively, object bases 1882 (see FIG. 18) can have a permanent link to the user's personal base server 1822 (or personal base 1820), thereby enabling automatic scheduling of events, etc., without need for intercommunications mechanisms such as e-mail.

Figure 18:
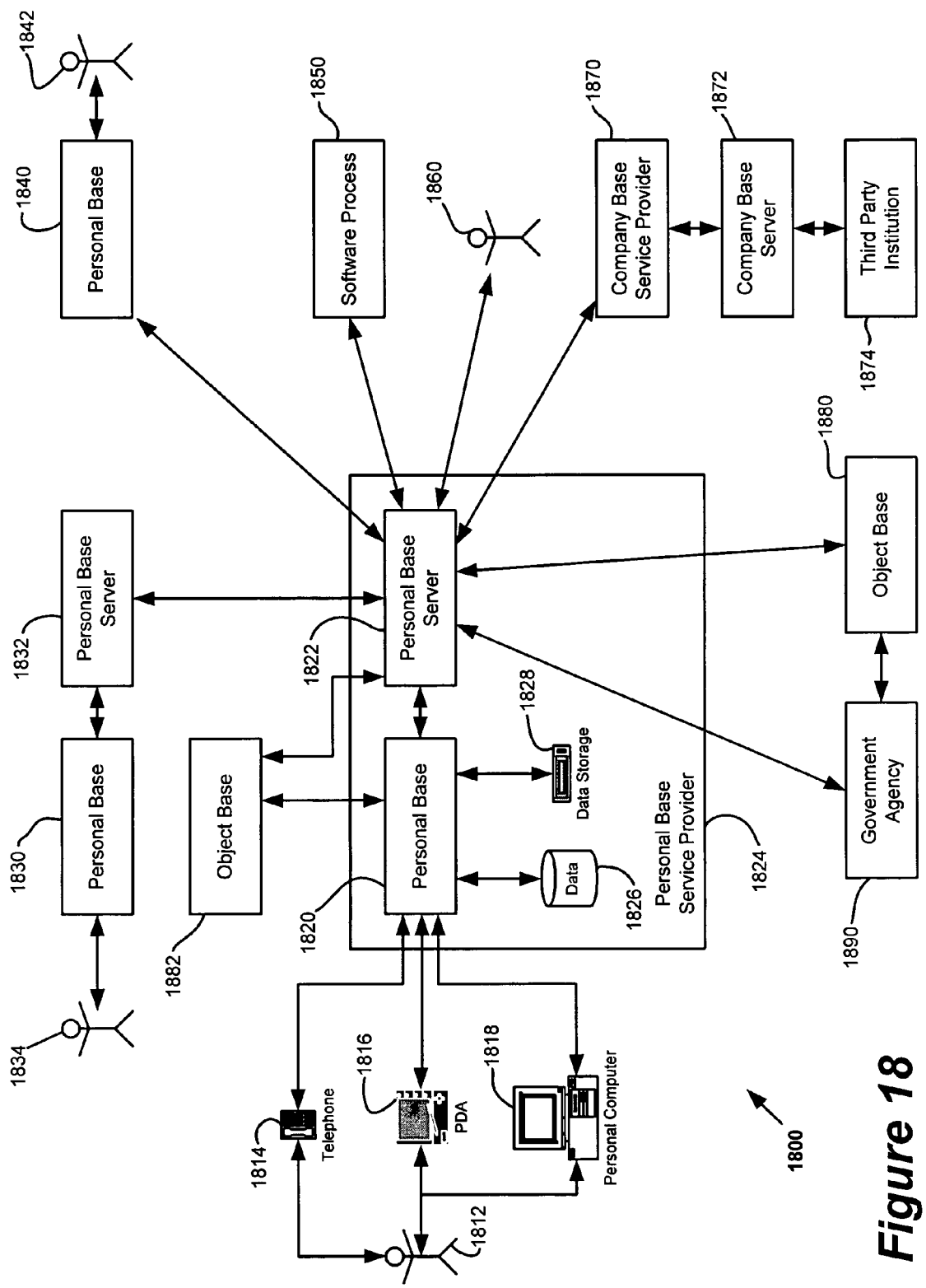
FIG. 18 is a schematic block diagram of an embodiment of the present invention.

An embodiment of the present invention is illustrated in FIG. 18. The computer system 1800 of the present invention has a user 1812 that communicates with a personal base 1820 via one or more intermediary devices such as telephone 1814, personal digital assistant ("PDA") 1816, and personal computer 1818. Although these three devices are suitable intermediary devices, they are not the only ones that can be used. Any device that can interact with the personal base (using any mutually available protocol), and that has some form of user-interface, would be a suitable intermediary device for use with the present invention.

In this embodiment of the present invention, personal base 1820 resides within a personal base service provider 1824, such as a telecommunications company, or standalone provider. In the preferred embodiment, the personal base service provider 1824 includes a personal base server 1822, a database 1826, and a data storage element 1828. The database 1826 and the data storage element 1828 are used to store data that is specific to the user 1812 for use in various transactions involving the user's personal base 1820 and the personal base server 1822. The personal base server 1822 is preferably a separate process from the personal base 1820. Having separate processes enables one device of the overall computer system to handle interactions with a variety of mechanisms (and have the necessary hardware) for the personal base server 1822 while the personal base process 1820 can be embedded in a simpler device that does not requires all of the disparate communications hardware that is required of the personal base server 1822. However, as technology advances and enables more functionality in smaller packages, it may become desirable for the personal base 1820 to handle all of the communications and persistence functions that are envisioned for the personal base server 1822. In that case, the personal base server 1822 can be merged into the personal base 1820.

The personal base service provider 1824 (see FIG. 18) is the institutional aspect of the present invention. The personal base service provider 1824 is the entity that provides the necessary hardware (servers, disk space, network connectivity, etc.) that is necessary for the implementation of the present invention. The personal base service provider may also arrange for the personal base to have a particular domain name and static Internet Protocol (IP) address, although the IP address can be arranged easily by other parties, including the user. Although the personal base service provider is the institutional entity, the personal base server 1822 provides the persistent interface to the Internet or wide area network on behalf of the user 1812. The personal base server 1822 is the software entity that interfaces with other personal base servers 1832, software processes 1850, users 1842, 1860 and their personal bases 1840 (if any). Moreover, the personal base server 1822 is the software entity that coordinates the transactions with third-party institutions 1874, either directly or through their own company base servers 1872 and company (organization) base service providers 1870. Similarly, the personal base server 1822 can communicate with an object base 1880 or a governmental agency 1890 as illustrated in FIG. 18. Moreover, the governmental agency 1890 can communicate with object bases to query registration information or compliance with legal requirements and notify the user's personal base 1820 via the personal base server 1822 if something is awry. In this sense, the personal base server 1822, and hence the personal base 1820, become a persistent virtual entity that can represent the user 1812 on the computer network 1800 for a wide variety of tasks.

In this embodiment of the present invention, the personal base 1820 and the personal base server 1822 are implemented in software. However, it is well within the scope of the present invention for part or all of the personal base 1820 or the personal base server 1822 to be implemented in hardware. It should also be noted that there is no requirement that the personal base 1820 coexist with the personal base server 1822 on the same machine. So long as the personal base 1820 can communicate with the personal base server 1822 via a predetermined, mutually acceptable protocol, then the personal base 1820 can be instantiated on any suitable machine separate and apart from the machine where the personal base server 1822 is instantiated, thereby enabling the personal base to exist on a portable device. However, if the two instantiations are on separate devices, then it is advisable to have encrypted communication between the personal base 1820 and the personal base server 1822.

In operation, the user's personal base 1820 is connected to, and fed data from, the personal base server 1822 that is located in the personal base service provider 1824. The personal base server 1822 attaches hierarchical information tags ("tags") to data that is contained within the user's personal base 1820 in order to allow that data to be identified and sorted. One set of tags labels data as either a request posting (i.e., data that was submitted to request information, products, or services) or a supply posting (i.e., data that was submitted to announce the availability of information, products, or services). Other tags can denote other categories and sub-categories to which specific data belong. Additional tags may denote ranges for time, geographic location, price, security, privacy, priority, and other related information.

The present invention facilitates automated responses to requests that are posted by the user 1812. The automated response is handled by the personal base server 1822 by means of a tag-matching process. The tag-matching process retrieves either an exact match, or the closest matches of the relevant tags contained with the user's 1812 request posting or the subsequent supply postings from other entities on the computer system 1800. Tag matching allows the user 1812 to issue a request posting to his personal base 1820 that seeks relevant information from another user 1860, another personal base 1840, another software process 1850, or a third-party institution 1874, or any other entity that is connected to the computer system 1800 that can communicate in one of the many protocols supported by the personal base server 1822, including, but not limited to, TCP/IP and UDP. Conversely, the user 1812 may also issue a supply posting to his personal base 1820 that is intended to be matched to other people's request postings. For example, if the user 1812 wants to buy a digital camera, he can issue a request posting to his personal base 1820 specifying brand, price, and other requirements of the camera. The user's request will be picked up by other entities on computer network 1800 and appropriate (supply) responses will be posted to the user's personal base server 1822, which will then be transmitted to the user's personal base 1820 for dissemination to the user 1812 by one or more of the intermediary devices 1814, 1816, 1818 mentioned previously. The user 1812 can then sort through the various requests, using the embedded tags as sorting values. Similarly, the user 1812 can redefine the request, perhaps by limiting the tags' ranges, to fine-tune search results. Future offers to sell may also be forwarded automatically to the personal base 1820 if the user 1812 identifies his request posting as a standing request. More and more business transactions may be conducted using this kind of "reverse advertising," wherein the individual user "advertises" his desire for a product and service and suppliers respond to his advertisement directly, rather than through some sales middleman.

The information-matching process performed by the personal base server 1822 may include the use of "intelligent" software agents. These agents make use of extensive databases of current postings, matching patterns, correlation between patterns, statistical data such as frequently used phrases in request/supply postings, and an extended thesaurus of tags.

Figure 19:
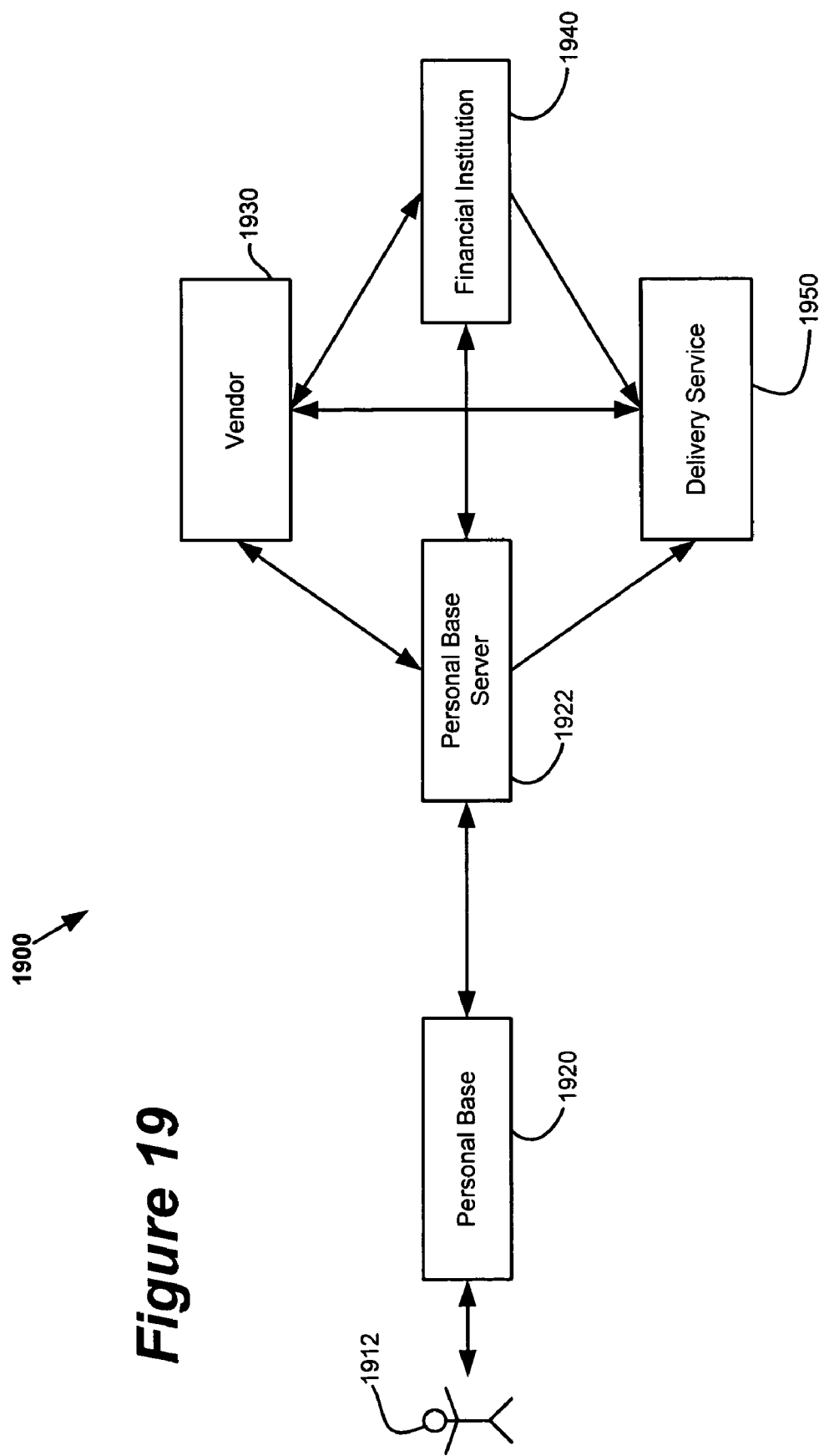
FIG. 19 is a schematic block diagram of an embodiment of the present invention that includes a third-party verification of a transaction.

FIG. 19 illustrates an alternate embodiment of the present invention, wherein a product is automatically purchased by and delivered to user 1912. In this embodiment, the computer network 1900 has a user 1912, his personal base 1920 and associated personal base server 1922. Also connected to the computer network 1900 are a vendor 1930, a financial institution 1940, and a delivery service 1950, either or all of which may be represented by their own respective personal base server 1822, company base 1872, or object base server 1880 (see FIG. 18). The automatic purchase begins when user 1912 posts a request on his personal base 1920. By posting the request, user 1912 delegates to his personal base server 1922 the authority to execute a transaction if a suitable supply response is received. Next, vendor 1930 forwards its supply response to personal base server 1922. Alternatively, personal base server 1922 might seek out a supply posting by forwarding the request posting of user 1912 to various vendors (including vendor 1930) and personal base servers (not shown). In either case, upon confirming that the supply response of vendor 1930 fits the pre-defined criteria of the request posting, personal base server 1922 automatically contacts the vendor 1930.

Next, the transaction must be approved by financial institution 1940. For that purpose, both the vendor 1930 and the personal base server 1922 send the details of their agreed-upon transaction to financial institution 1940, for approval and execution of the transaction. In this embodiment, financial institution 1940 is affiliated with user 1912 as his bank or credit card provider. Alternatively, financial institution 1940 could be affiliated with vendor 1930, or with personal base server 1922, or could be unaffiliated with the interested parties. Alternatively, personal base server 1922 could contact the appropriate financial institution(s) to verify financial standing of both user 1912 and vendor 1930, masking the identity of each party from each other party's knowledge. In this case, a user will not need to reveal credit card numbers to vendors while making an online purchase.

Upon approval of the financial transaction, the financial institution notifies vendor 1930, personal base server 1922, and delivery service 1950. Vendor 1930 and personal base server 1922 then send, respectively, pickup and delivery addresses to delivery service 1950. User 1912 need not reveal his home address or his identity to vendor 1930. Personal base server 1922 instead issues to vendor 1930 and to delivery service 1950 a transaction ID to match the product to its destination address. Finally, to assist in eliminating potential confusions, all of the aforementioned interrelated information is stored on the personal base server 1922.

Figure 20:
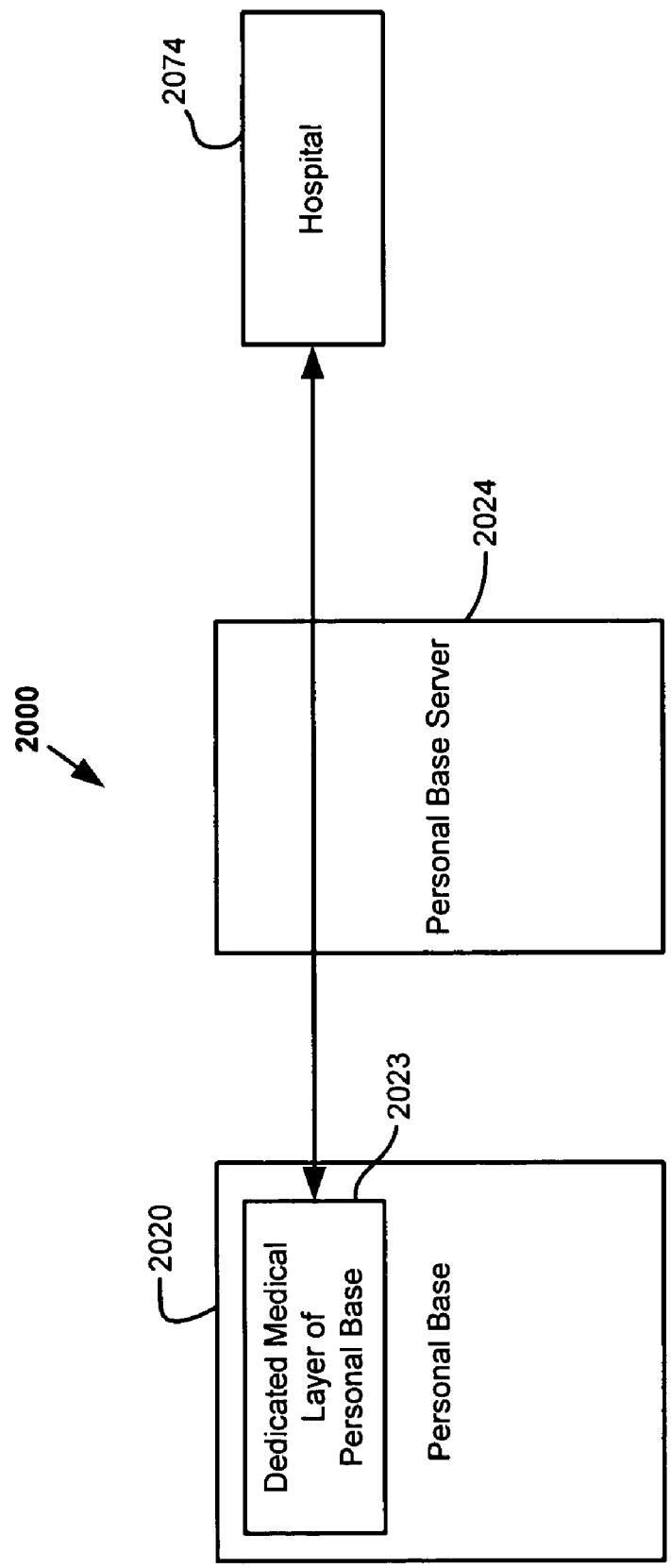
FIG. 20 is a schematic block diagram of an embodiment of the present invention that illustrates the construction of a Personal Base layer inaccessible to the Personal Base owner.

FIG. 20 illustrates an embodiment of the present invention, specifically the construction within a computer network 2000 of a dedicated medical layer 2023 of personal base 2020, which is inaccessible to the user (not shown). Dedicated medical layer 2023 was created with the consent of the user to provide a private location for medical data. Without such privacy measures guaranteed to them, medical personnel of hospital 2074 might have refused to supply data to the personal base server 2024. Also, for the benefit of having his medical data stored by his trusted personal base service center (not shown), the user readily agreed to forgo access to his own medical data, or may otherwise have read-only access rights to that medical data. A further benefit of installing the dedicated medical layer 2023 is that medical institutions other than hospital 2074 can make requests to the personal base service center for access rights when needed, for instance in the case of a medical emergency. Alternatively, the dedicated layer of the personal base 2023 may be stored in a personal base server (not shown), or with a government agency (not shown) or with a medical institution's company base server (not shown).

Figure 21:
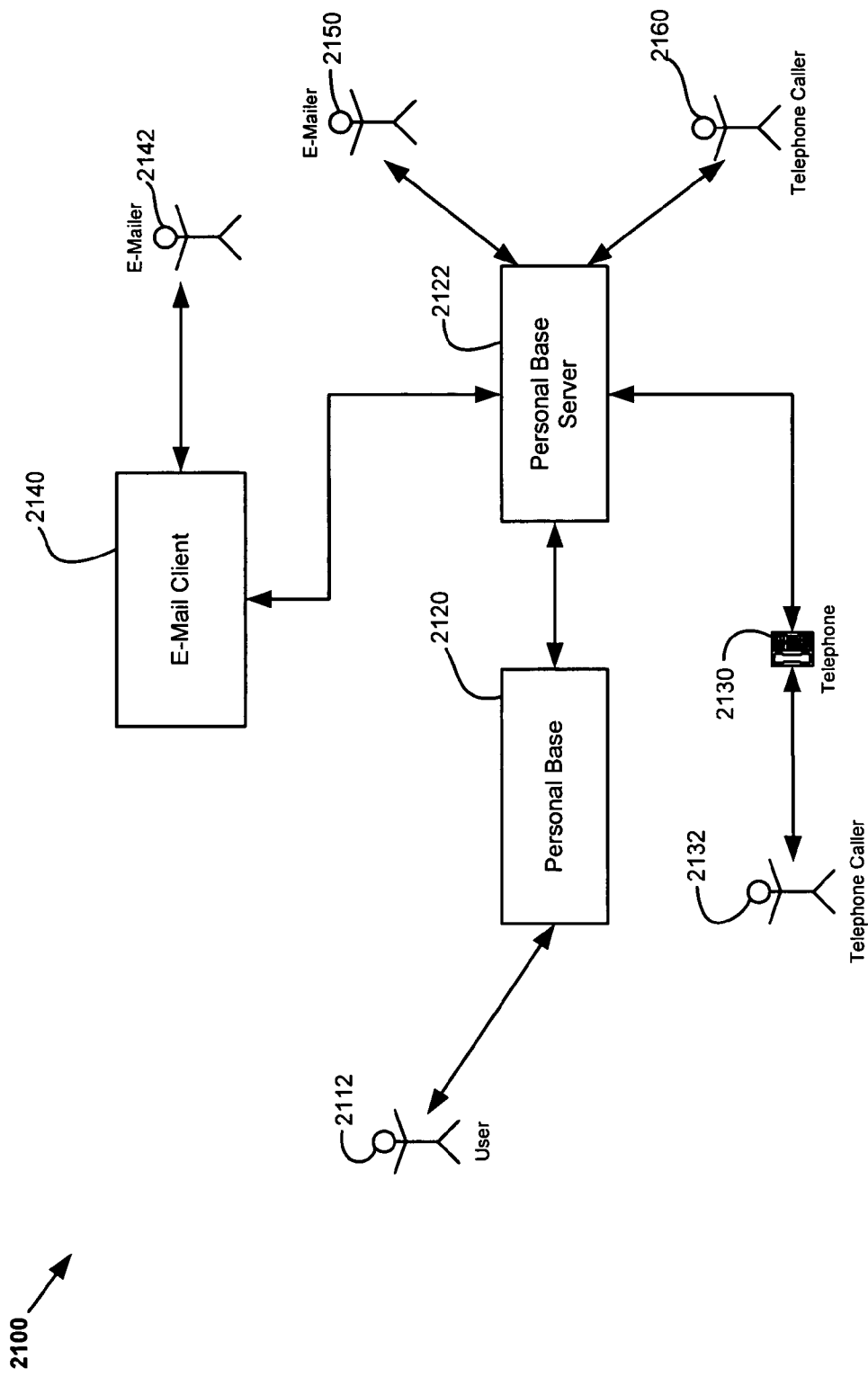
FIG. 21 is a schematic block diagram of an embodiment of the present invention that includes elements of the traditional Internet.

Shown in FIG. 21 is an embodiment of the present invention that includes elements of the traditional Internet. Telephone caller 2132 uses telephone 2130 to connect via the traditional telephone network or via the traditional Internet to personal base server 2122 that is connected to the personal base 2120, which interfaces with user 2112, all within the computer network 2100. The connection is established via the dialing of the direct telephone number of user 2112.

Telephone caller 2160 is connected through the personal base via a wide area network such as the Internet to the personal base server 2122, which in turn is connected to personal base 2120. The caller 2160 may have used the Universal ID number (not shown) of the user 2112, or a pre-selected link on the personal base of the caller 2160 to initiate these connections. However, whether user 2112 answers the call or not depends on his current priority list (at work or at home) and the position of caller 2160 on the caller priority list of user 2112 (according to the status of caller 2160 as a family member or as a stranger, for example). Both caller 2132, using the traditional telephone network, and caller 2160, using the personal base that is connected to the Internet, are easily able to telephone user 2112, thanks to the unobtrusive integration of the personal base enhanced Internet than when using only the traditional Internet and the traditional telephone network.

E-mailer 2142 uses his e-mail client 2140 to connect via the Internet to his personal base server 2122 that is in operative communication with the personal base 2120. The connection is established by addressing the e-mail to the direct e-mail address of the user 2112.

E-mailer 2150 is connected via the Internet to the personal base server 2122, which in turn is connected to the personal base 2120, which in turn interfaces with its owner, user 2112. E-mailer 2150 may use the Universal ID number of user 2112 (not shown) or a pre-selected link on his personal base 2120 to initiate these connections. Both E-mailer 2142 and E-mailer 2150 are easily able to send e-mail to user 2112, due to the unobtrusive integration of the personal base with the traditional Internet.

The Universal ID number is a new number, which represents a single individual, for instance, user 2112. Normally, the user would be expected to input this number sequence (or an alphanumeric sequence) into the digital device that provides Internet or telecommunication connectivity. For example, the Universal ID number can be a 1-800 telephone number, such as 800-TOM-WONG. When using a telecommunications device, the 1-800 number would be used. When using a device connected to the Internet, then the same Universal ID number would be used, but it could be combined with standard internet protocols in the same or similar ways that a domain name is used. For example, once a Universal ID is known, it can be used to send an email to that person, simply by entering 800-TOM-WONG@phonesite.com. If Mr. Wong is not within the user's domain, the personal base 2120 will contact the personal base server 2122 and secure the correct domain, revise the recipient address accordingly, and send the message.

A great feature of the Universal ID is that it can replace all of the existing addresses and IDs of user 2112, such as his home address, work address, e-mail addresses, and telephone numbers, etc. The Universal ID number could eventually be internationally universal, and may coexist with current addresses and IDs.

For representation purposes, then, user 412 needs only his name, one ID, one ID interface device, his personal base 2120, and one set of passwords for all online and offline activities. For offline activities, an ID interface device automatically connects the real world to the personal base-enhanced Internet necessary for achieving this connection. An example of an ID interface device would be a card that looks like a credit card. The magnetic stripe on this card would contain only the Universal ID number of user 2112. Since the card would not contain any personal data, it would offer better security than a personal data-rich "smart" card.

A Universal ID interface card may play the role of all of the current cards of user 2112, including his debit cards, credit card, and driver's license. Card security is achieved through the use of a Personal Identification Number ("PIN") that must be remembered by the owner, user 2112. In case of the loss of a card, user 2112 can easily report to the personal base service center and get a replacement with a new PIN. Like a smart card, the Universal ID interface card is a replacement for all other cards. The interface card is also an improvement over the smart card; the interface card does not carry personal information and will not be made obsolete by changes in technology.

To illustrate the Universal ID system, further examples of applications assisted by the personal base-enhanced Internet are as follows: First, the Universal ID can replace a physical postal delivery address. For sending letters or packages to user 2112, a sender uses the universal ID for envelopes and labels. The Post Office (not shown) then contacts the personal base server 2122 to match IDs and their corresponding address. The Post Office next marks the mail with its own delivery code. With this approach, when a personal base owner moves, no change of address notice is needed either for the Post Office or for his family and friends. The only thing the personal base owner, user 2112, does is to change his address on the personal base 2120. Similarly, this approach can be easily applied to other address changes, such as e-mail or telephone number changes.

As a second example of an application of the Universal ID, to buy a product at a store, user 2112 slides his ID card through a receiving device at the checkout counter and enters his PIN (not shown). First, the transaction details are sent to personal base server 2122. The personal base server 2122 then contacts the credit card Company of user 2112 for approval of this transaction (not shown). The store will send the bill to the credit card Company and send a transaction record to personal base 2120. At the same time, the Universal ID and the transaction are saved into the store's database. That database will be used for a receipt, for recalls, and for advertising reference. Online shopping may be conducted in a similar fashion.

As a third example of an application of the Universal ID, to participate in an event, after pre-registering, user 2112 may be registered automatically by giving the event clerk his Universal ID card. If the event is a conference, information will be retrieved from personal base 2120 and recorded in the registration database of the conference (not shown). In the future, notices for similar conferences will be sent to personal base 2120. If applicable, a bill will be sent to personal base 2120 as well. This process for participating in events applies also to a visit to a doctor's office, or a concert, or enrollment in a school.

In sum, using the Universal ID system enables user 2112 to interact effortlessly with the world, while retaining perfect control over his personal data. Vendors and service-providers may only access information authorized by personal base service centers. User 2112 should be able to protect the security of his ID, such as a universal ID card, with a personal identification number (PIN). Another happy consequence for user 2112 is that the number of unsolicited telephone calls or "spam" E-mails he receives will be reduced.

Figure 22:
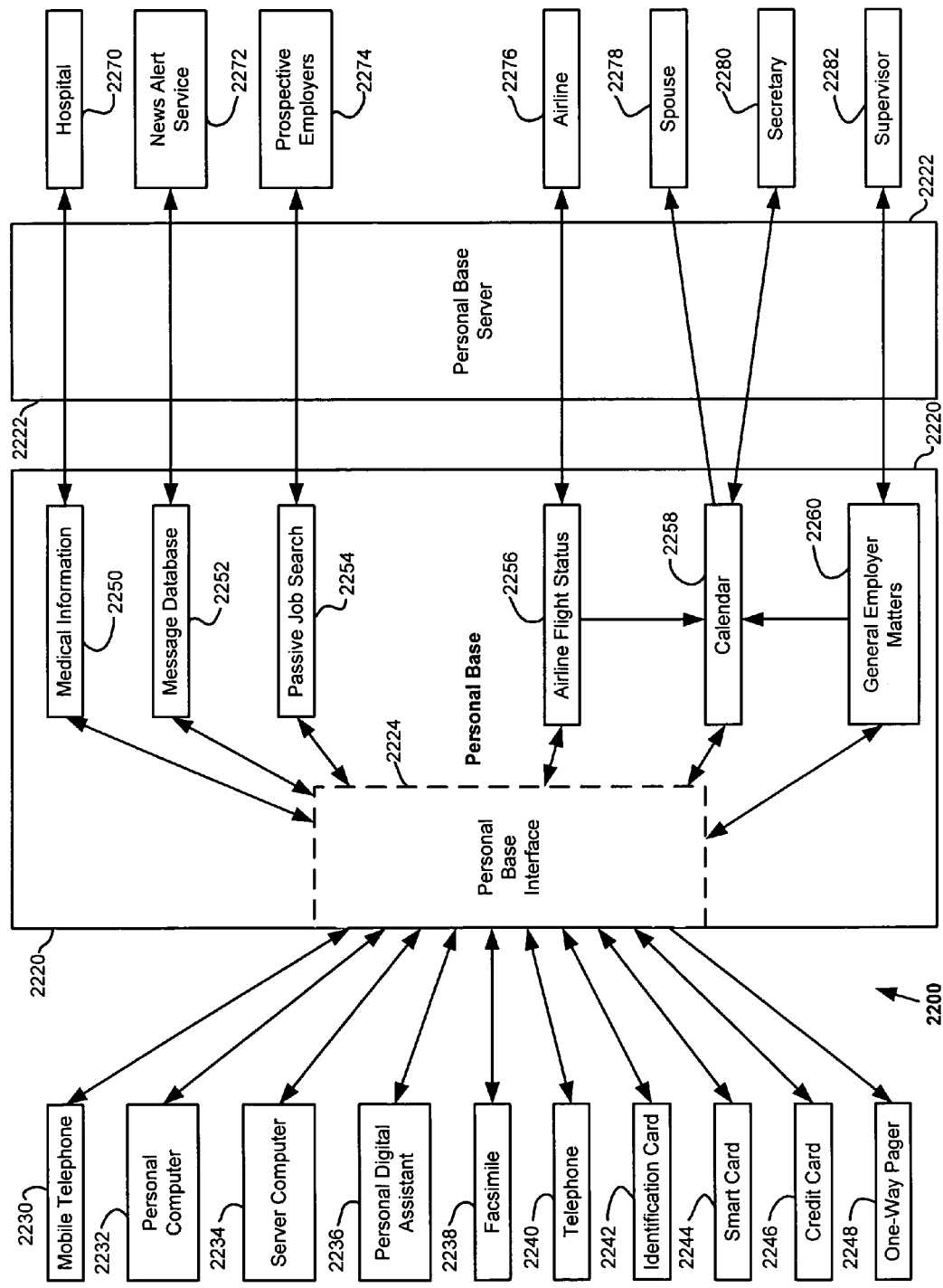
FIG. 22 is a schematic block diagram of an embodiment of the present invention that includes devices that are used to access a Personal Base.

Shown in FIG. 22 is an embodiment of the present invention that includes devices that are used to access a personal base 2216. Personal base 2216 comprises a user interface 2224 and personal base layers 2250, 2252, 2254, 2256, 2258, and 2260. User interface 2224 directs data and intermediates between the database layers of personal base 2220 and devices 2230, 2232, 2234, 2236, 2238, 2240, 2242, 2244, 2246, and 2248. Of these devices, mobile phone 2230, personal computer ("PC") 2232, server computer 2234, personal digital assistant ("PDA") 2236, facsimile 2238, telephone 2240, identification card 2242, smart card 2244, and credit card 2246 are employed in two-way connections to personal base 2220, via user interface 2224. One-way pager 2248 in a one-way connection to initiate receipt of information from personal base 2220 via interface 2224.

Layers 2250, 2252, 2254, 2256, 2258, and 2260 are parts of the personal base 2220. The layers are connected to interface 2224, which is in turn in connected to devices 2230, 2232, 2234, 2236, 2238, 2240, 2242, 2244, 2246, and 2248. Medical information 2250 employs a two-way connection to hospital 2270 via personal base server 2222. The highly sensitive data stored in layer 2250 is unavailable even to interface 2224, per the embodiment shown in FIG. 20. Since the personal base user may monitor neither the content nor the access log of layer 2250, failsafe authentication of hospital 2270 is needed.

Authentication is important to both users and service providers. All personal bases have the option of being registered by a personal base service center. Non-registered personal bases are not permitted to participate in any transactions requiring registration.

Qualified service providers must obtain registration IDs and authentication of good standing in their lines of business from personal base service centers, in order to be authorized to send information to appropriate layers within the user's personal base 2220. Hospitals, as in the present embodiment, are authorized to add information only to the medical information layer 2250 within personal base 2220. Car repair shops (not shown) are authorized to send car repair records to personal base 2220, and perhaps to access existing repair records (not shown).

In a transaction process, the validity of a registration or an authorization will be authenticated. Financial means verification is a crucial part of this authentication; the parties to the transaction demand accurate representation of the other parties' resources.

Referring again to FIG. 22, message database 2252 employs a connection to news alert service 2272 via personal base server 2222, whereby news updates are sent to the message database 2252. Layer 2252 in turn employs a connection to interface 2224, whereby the news updates are routed to a user device, and whereby the user may store messages and files in layer 2252.

Passive job search 2254 employs connections to prospective employers 2274 via personal base server 2222, whereby employment opportunities are sent to layer 2254. Layer 2254 in turn employs a one-way connection to interface 2224, whereby employment opportunities are routed to a user device. A passive job search is an activity perhaps not suitable for the use of one's main Universal ID (not shown). In this case, another Universal ID can be ordered, for use in clandestine activities.

Airplane flight status 2256 employs a one-way connection to airline 2276 via personal base server 2222, whereby flight information is sent to layer 2256. Layer 2256 in turn employs a connection to interface 2224, whereby the flight information is routed to a user device. Layer 2256 also employs a one-way connection to calendar 2258, whereby the flight information is entered or revised in the calendar 2258.

General employer matters 2260 employs a connection to supervisor 2282 via personal base server 2222, whereby the employer's memoranda are sent to layer 2260. Layer 2260 in turn employs a connection to interface 2224, whereby the memoranda are routed to a user device. Layer 2260 also employs a one-way connection to calendar 2258, whereby employer-ordered meetings and deadlines are entered or revised in calendar 2258.

Calendar 2258 is connected to layers 2256 and 2260, whereby appointments and events are entered or updated in calendar 2258. Calendar 2258 also employs a one-way connection to spouse 2278 via personal base server 2222, whereby spouse 2278 may have read-only access to calendar 2258. Calendar 2258 further employs a connection to secretary 2280 via personal base server 2222, whereby secretary 2280 may both read and revise calendar 2258. Last, calendar 2258 further employs a connection to interface 2224, whereby the user may both read and revise his own calendar 2258.

Shown in FIG. 23 is an example of a user's Web page-format view 2302 of his personal base. From this front page, the user may access second-level pages. The user may then access the entire online universe from second-level pages such as "Transactions" and "Work," without viewing a single external Web page. In sum, to the user, the personal base is the whole world, "virtually"; all kind of activities can be done there, including communicating with other personal bases. To others, the personal base is "virtually" its owner. The personal base is a dynamic "face" presented to others, with different features presented to every external entity. With personal bases as their virtual existence, individual users finally become the center of Internet use.

Figure 24:
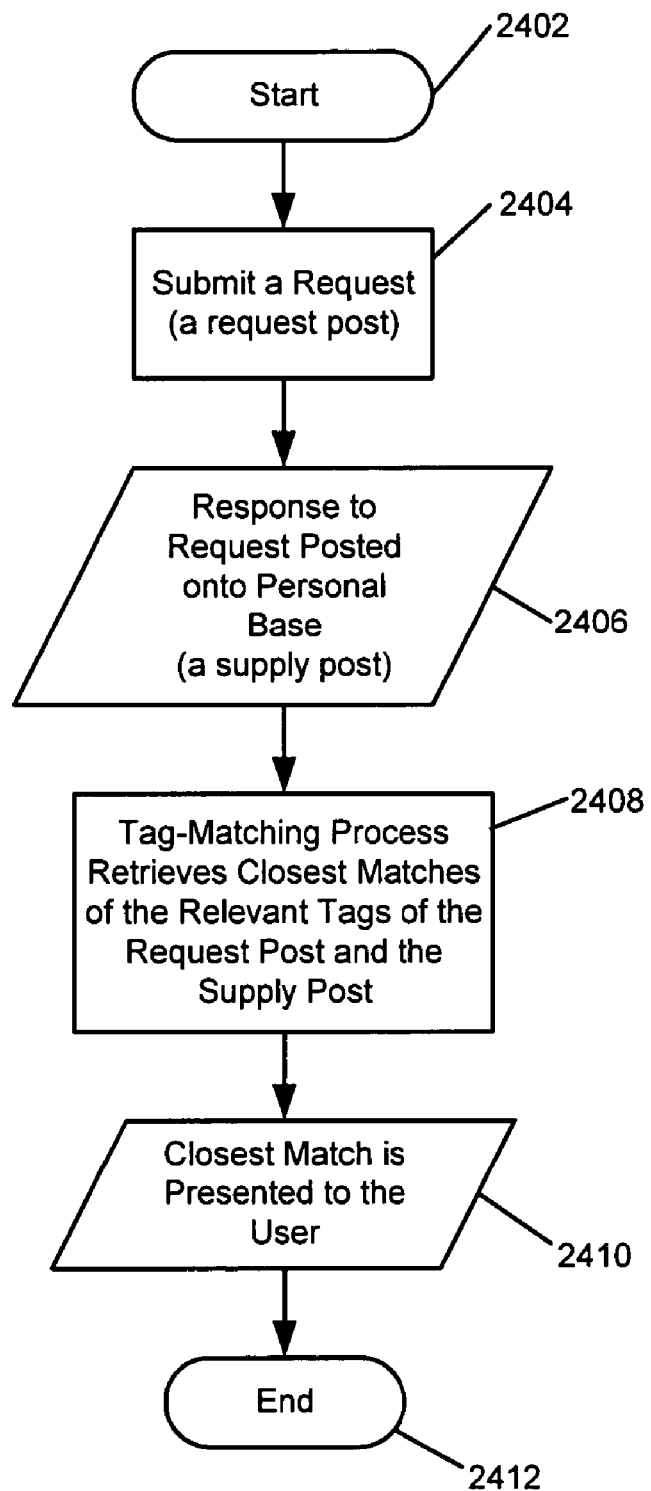
FIG. 24 is a flowchart illustrating a method of the present invention.

Shown in FIG. 24 is an embodiment of the information matching method of the present invention. The information matching method begins generally at step 2402. Next, in step 2404, the user submits a request, by, for example, issuing a request posting to his personal base. Then, in step 2406, a supply posting is sent to the personal base by the supplier, via a personal base server. Next, in step 2408, the personal base server performs a tag-matching process by comparing tags of the request posting to tags of all supply postings. Then, in step 2410, the best match of postings achieved by the personal base server is presented to the user. Last, in step 2412, the method ends.

Figure 25:
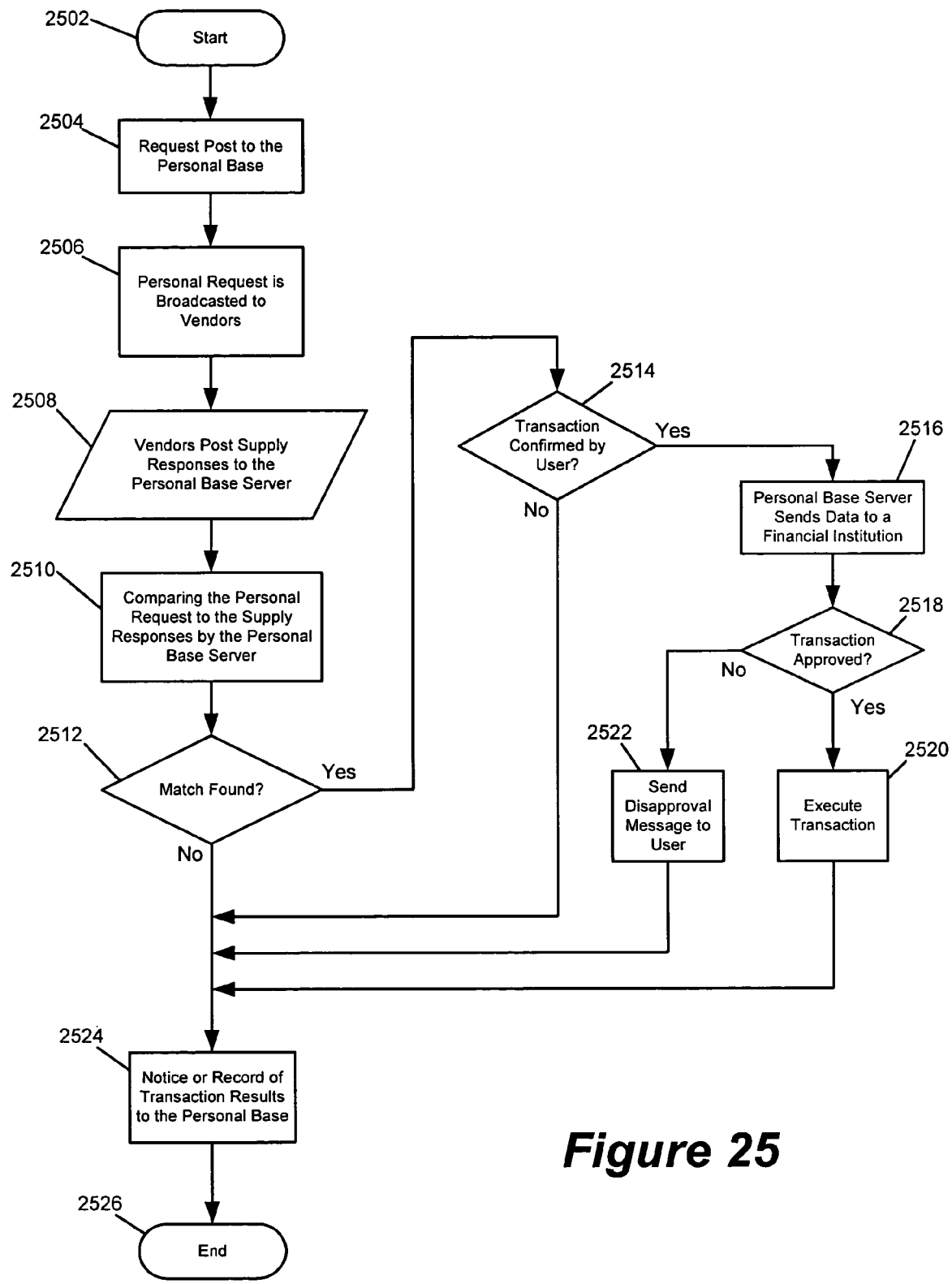
FIG. 25 is a flowchart illustrating an alternate embodiment of the method of the present invention.

Shown in FIG. 25 is an embodiment of the transaction method of the present invention. The transaction method begins generally at step 2502. Next, in step 2504, the user submits a request by, for example, issuing a request posting to his personal base. Then, in step 2506, the personal base server broadcasts the request posting to service-providers and vendors. Next, in step 2508, service-providers and vendors issue supply postings to the personal base server. Then, in step 2510, the personal base server performs a tag-matching process by comparing tags of the request posting to tags of all supply postings. Next, in step 2512, a decision is made based on whether or not a match was found in the tag-matching process. If a match was not found, the method proceeds to step 2524, where a notice is optionally issued to the personal base before the method ends at step 2526. If a match was found, then the method proceeds to step 2514. In step 2514, a decision is made based on whether or not the transaction is confirmed by the user. If the transaction is not confirmed, then the method proceeds to step 2524, where a notice is optionally issued to the personal base before the method ends at step 2526.

If the transaction is confirmed, then the method proceeds to step 2516. In step 2516, the personal base server sends data related to the transaction to a financial institution. This data comprises the identities of the transacting parties and the nature of the transaction. In step 2518, a decision is made based on whether or not the financial institution approves the transaction. If the transaction is not approved, then the method proceeds to step 2522, wherein the personal base server sends a message to the user that the transaction has been rejected. Last, in step 2524, the method ends. If, however, the transaction is approved, then the personal base server executes the transaction in step 2520. Finally, the method proceeds to step 2524, where a notice and a transaction record are made to the personal base and the method ends at step 2526.

It should be noted that the apparatus and method of the present invention can be implemented in a variety ways. For instance, the bases can be implemented entirely in software, or entirely in hardware, or any combination there between. Software implementations (or portions thereof) can utilize a processor, either in an existing device, a server, or in an embedded devices, in conjunction with an appropriate amount of memory and input/output devices. Hardware implementations, such as application specific integrated circuits (ASIC's) are envisioned for hand-held or special-purpose devices that make the present invention more accessible for users.

The invention, therefor, is well adapted to carry out the objects and to attain the ends and advantages mentioned, as well as others inherent therein. While the invention has been depicted, described and is defined by reference to exemplary embodiments of the invention, such references do not imply a limitation on the invention, and no such limitation is to be inferred. The invention is capable of considerable modification, alternation and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is to be limited only by the spirit and scope of the appended claims, giving full cognizance to equivalents in all respects.

What is claimed is:

1. A system comprising:
one or more processors;
a memory configured to store executable instructions that cause at least one of the one or more processors to:
provide a personal base; and
provide a personal base server;
wherein the personal base and the personal base server implement a phonesite that is accessible by a phonesite user, wherein the phonesite acts as an intelligent network agent for the phonesite user on a network and is delegated authority by the phonesite user to execute a purchasing transaction based on a decision-making process on behalf of the phonesite user and without user intervention;
wherein:
the personal base server is configured to communicate with a second software process via the network;
the phonesite user communicates with the personal base via a client device; and
the phonesite user communicates with the second software process through the personal base server;
display a customizable menu comprising a set of user selectable options provided by the phonesite; and
receive phonesite user purchase criteria via the communication device;
wherein:
upon receiving the phonesite user purchase criteria, the personal base causes the personal base server to communicate with the second software process via the network; and
if information received via the network matches the phonesite user purchase criteria based, at least in part, on a thesaurus of tags, then the phonesite executes the purchasing transaction without prompting the phonesite user.

2. The system of claim 1, wherein the network is a wide area network.

3. The system of claim 1, wherein the network is the Internet.

4. The system of claim 1, wherein the network is a telecommunication system.

5. The system of claim 1, wherein the client device is a personal computer.

6. The system of claim 1, wherein the client device is a telephone.

7. The system of claim 1, wherein the client device is a personal digital assistant.

8. The system of claim 1, wherein the second software process is a second personal base.

9. The system of claim 1, wherein the second software process is a second personal base server.

10. The system of claim 9, wherein the second personal base server belongs to a third party.

11. The system of claim 1, wherein the second software process is an object base.

12. The system of claim 1 further comprising a database.

13. The system of claim 1 further comprising a data storage device.

14. A computer program, stored on a tangible storage medium for providing communication services, the computer program including executable instructions that cause a computer to:
provide a personal base; and
provide a personal base server;
wherein the personal base and the personal base server implement a phonesite that is accessible by a phonesite user, wherein the phonesite acts as an intelligent network agent for the phonesite user on a network and is delegated authority by the phonesite user to execute a purchasing transaction based on a decision-making process on behalf of the phonesite user and without user intervention;
wherein:
the personal base server is configured to communicate with a second software process via the network;
the phonesite user communicates with the personal base via a client device; and
the phonesite user communicates with the second software process through the personal base server;
display a customizable menu comprising a set of user selectable options provided by the phonesite; and
receive phonesite user purchase criteria via the communication device;
wherein:
upon receiving the phonesite user purchase criteria, the personal base causes the personal base server to communicate with the second software process via the network; and
if information received via the network matches the phonesite user purchase criteria based, at least in part, on a thesaurus of tags, then the phonesite
executes the purchasing transaction without prompting the phonesite user.

15. A method for providing communication services comprising:
providing a personal base; and
providing a personal base server;
wherein the personal base and the personal base server implement a phonesite that is accessible by a phonesite user, wherein the phonesite acts as an intelligent network agent for the phonesite user on a network and is delegated authority by the phonesite user to execute a purchasing transaction based on a decision-making process on behalf of the phonesite user and without user intervention;
wherein:
the personal base server is configured to communicate with a second software process via the network;
the phonesite user communicates with the personal base via a client device; and
the phonesite user communicates with the second software process through the personal base server;
displaying a customizable menu comprising a set of user selectable options provided by the phonesite; and
receiving phonesite user purchase criteria via the communication device;
wherein:
upon receiving the phonesite user purchase criteria, the personal base causes the personal base server to communicate with the second software process via the network; and
if information received via the network matches the phonesite user purchase criteria based, at least in part, on a thesaurus of tags, then the phonesite
executes the purchasing transaction without prompting the phonesite user.

* * * * *